US012579701B2

(12) United States Patent
Yamasaki et al.

(10) Patent No.: US 12,579,701 B2
(45) Date of Patent: Mar. 17, 2026

(54) IMAGING APPARATUS AND IMAGING SYSTEM

(71) Applicant: Panasonic Intellectual Property Management Co., Ltd., Osaka (JP)

(72) Inventors: Takaaki Yamasaki, Osaka (JP); Shinichi Yamamoto, Osaka (JP); Wataru Okamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 183 days.

(21) Appl. No.: 18/369,726

(22) Filed: Sep. 18, 2023

(65) Prior Publication Data

US 2024/0104791 A1    Mar. 28, 2024

(30) Foreign Application Priority Data

Sep. 22, 2022    (JP) ................................. 2022-151467

(51) Int. Cl.
| *G09G 5/00* | (2006.01) |
| *G06T 11/00* | (2006.01) |
| *G06V 10/44* | (2022.01) |

(52) U.S. Cl.
CPC .............. *G06T 11/00* (2013.01); *G06V 10/44* (2022.01)

(58) Field of Classification Search
CPC ....... G06F 9/4401; G06T 1/20; G06T 3/4007; G06T 9/00; G06T 11/001; G06T 11/60; G06T 11/00; H04L 51/51; G06V 10/44
USPC ........................................................ 345/581
See application file for complete search history.

(56) References Cited

U.S. PATENT DOCUMENTS

| 2003/0163833 | A1 | 8/2003 | Chiba et al. | |
| 2003/0198383 | A1* | 10/2003 | Yamaguchi | .............. G06K 7/14 |
| | | | | 382/183 |
| 2015/0036003 | A1* | 2/2015 | Sakurai | .................. H04N 5/772 |
| | | | | 348/207.11 |
| 2017/0228927 | A1* | 8/2017 | Sugimura | .............. H04N 7/181 |
| 2021/0133933 | A1* | 5/2021 | Suzuki | ...................... G06T 5/73 |
| 2022/0076396 | A1 | 3/2022 | Terada | |

FOREIGN PATENT DOCUMENTS

| JP | 2003-036435 | A | 2/2003 |
| JP | 2003-250025 | A | 9/2003 |
| JP | 2003-316638 | A | 11/2003 |
| JP | 2004-326423 | A | 11/2004 |

(Continued)

*Primary Examiner* — Gordon G Liu

(74) *Attorney, Agent, or Firm* — Renner, Otto, Boisselle & Sklar, LLP

(57) ABSTRACT

An imaging apparatus includes: a communication interface that communicates data with an image processing apparatus connected via a communication network, an image sensor that captures a subject image to generate image data, a controller that transmits the image data to the image processing apparatus via the communication interface, to request image processing for the image processing apparatus on the image data, and a setting interface that acquires setting information on a request for image processing, according to user operation, wherein based on the setting information acquired with the user operation, the controller limits specific image data from the image data generated by the image sensor, to request, for the image processing apparatus, specific image processing thereon.

9 Claims, 21 Drawing Sheets

(56) References Cited

FOREIGN PATENT DOCUMENTS

| | | | |
|---|---|---|---|
| JP | 2016-127564 | A | 7/2016 |
| JP | 2021-071989 | A | 5/2021 |
| JP | 7031067 | B2 | 3/2022 |
| WO | 2013/118535 | A1 | 8/2013 |

* cited by examiner

NOISE REDUCTION PROCESSING
(REQUEST CONTENT)

(UPLOAD CONDITION)
ISO SENSITIVITY:
○ 800 OR MORE
◉ 1600 OR MORE
○ 3200 OR MORE

*Fig. 6*

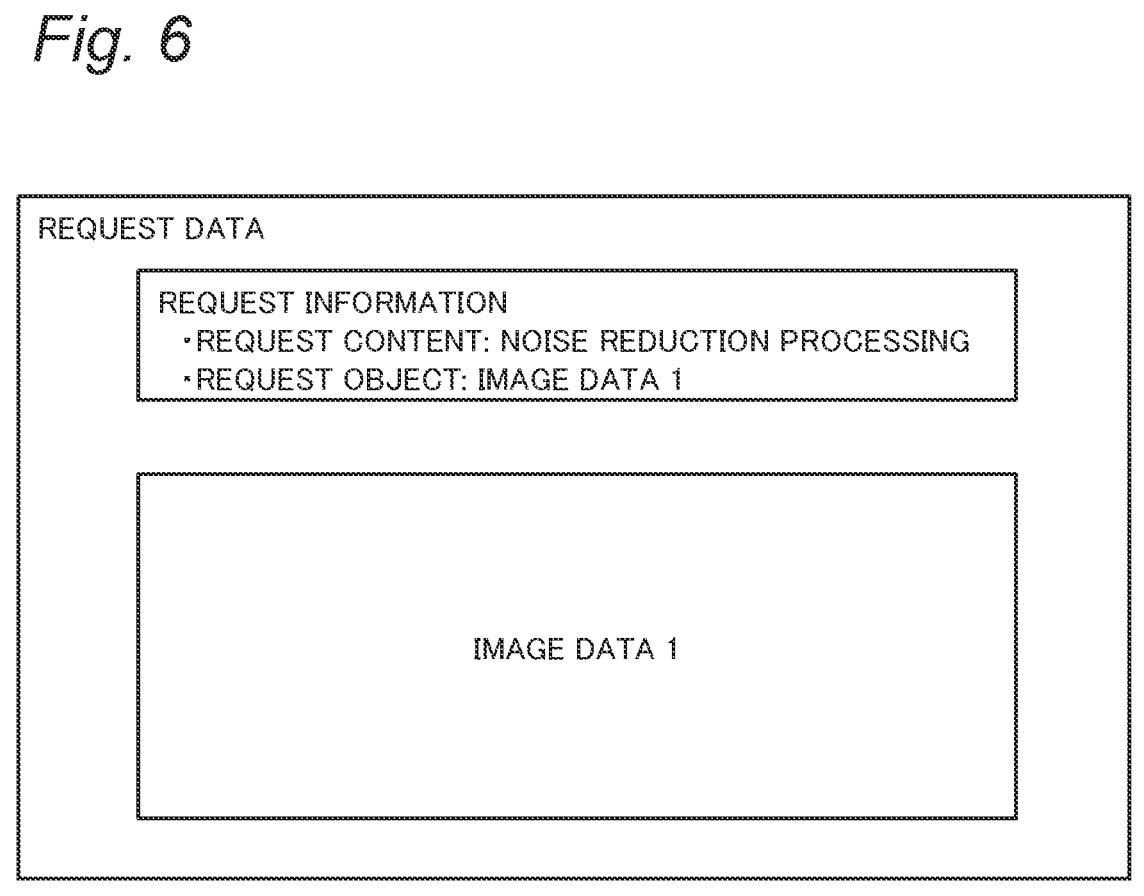

REQUEST DATA

REQUEST INFORMATION
  ·REQUEST CONTENT: NOISE REDUCTION PROCESSING
  ·REQUEST OBJECT: IMAGE DATA 1

IMAGE DATA 1

*Fig. 8*

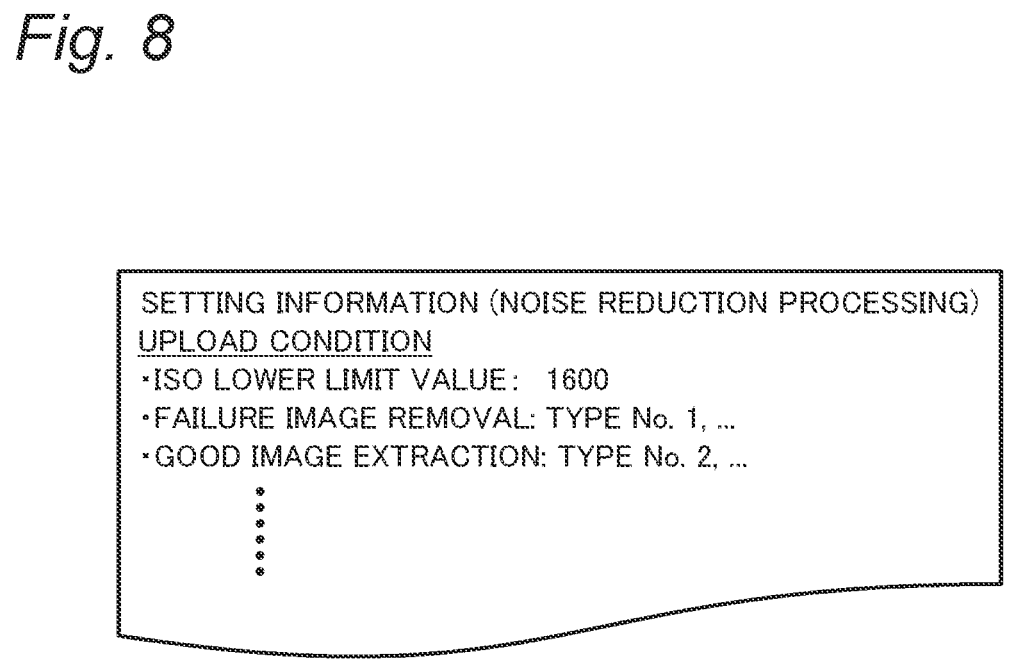

SETTING INFORMATION (NOISE REDUCTION PROCESSING)
UPLOAD CONDITION
・ISO LOWER LIMIT VALUE： 1600
・FAILURE IMAGE REMOVAL: TYPE No. 1, ...
・GOOD IMAGE EXTRACTION: TYPE No. 2, ...

Figure 9:
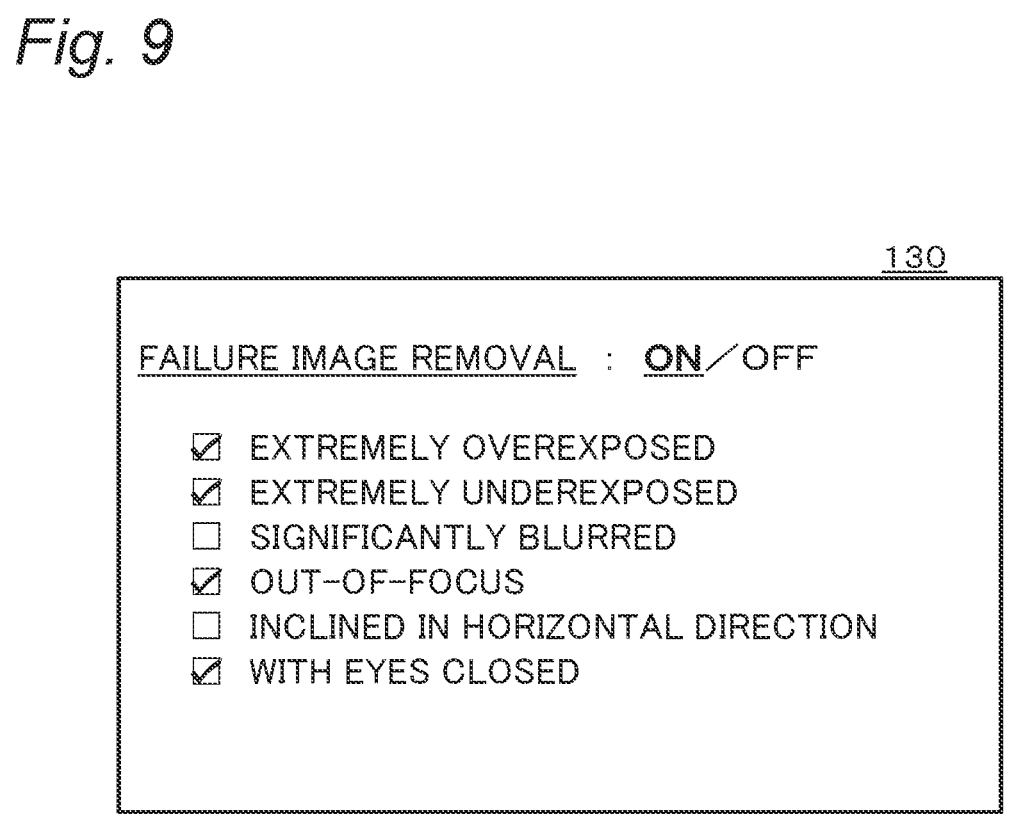

FAILURE IMAGE REMOVAL  :  ON∕OFF

☑ EXTREMELY OVEREXPOSED
☑ EXTREMELY UNDEREXPOSED
☐ SIGNIFICANTLY BLURRED
☑ OUT-OF-FOCUS
☐ INCLINED IN HORIZONTAL DIRECTION
☑ WITH EYES CLOSED

GOOD IMAGE EXTRACTION : ON／OFF

☐ SUBJECT HAS MOTION
☑ SHOWING FACE
☐ SUBJECT SIZE IS LARGE
☑ SMILING FACE

Fig. 13

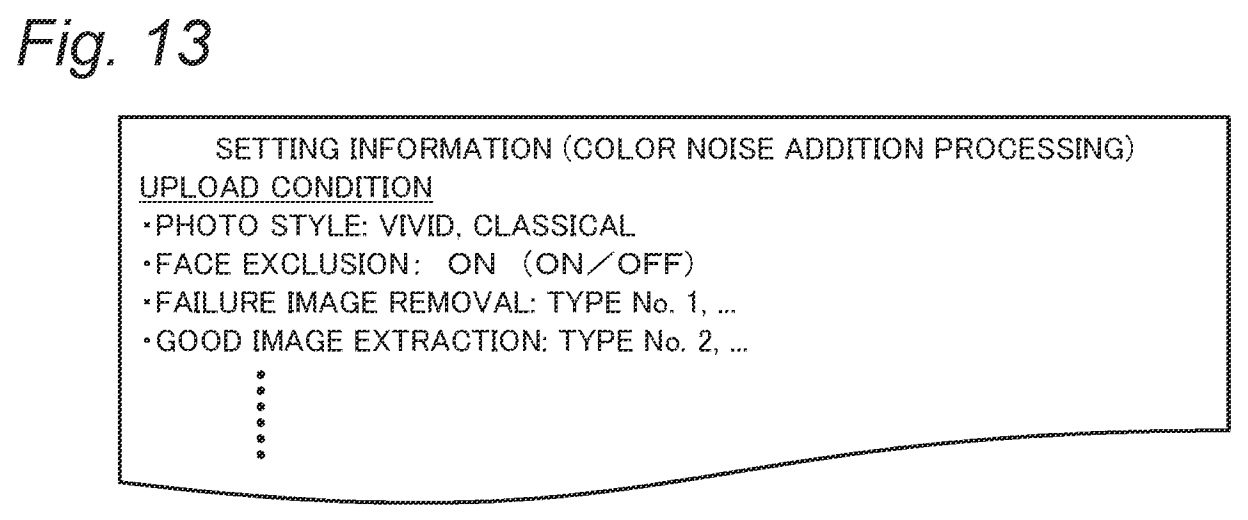

SETTING INFORMATION (COLOR NOISE ADDITION PROCESSING)

UPLOAD CONDITION
• PHOTO STYLE: VIVID, CLASSICAL
• FACE EXCLUSION: ON  (ON/OFF)
• FAILURE IMAGE REMOVAL: TYPE No. 1, ...
• GOOD IMAGE EXTRACTION: TYPE No. 2, ...

Figure 14:
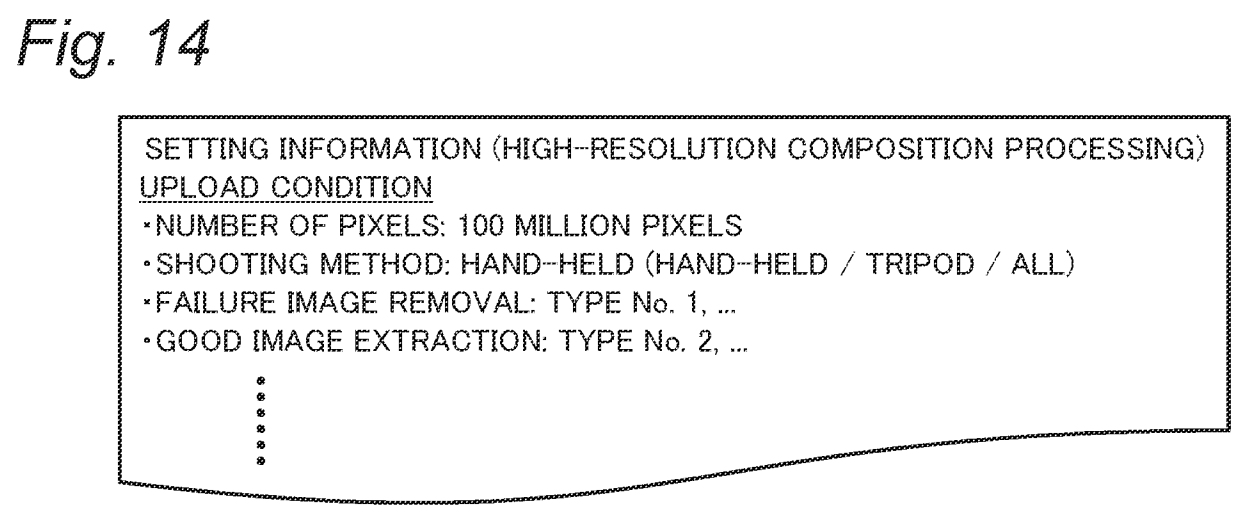

SETTING INFORMATION (HIGH-RESOLUTION COMPOSITION PROCESSING)

UPLOAD CONDITION

• NUMBER OF PIXELS: 100 MILLION PIXELS

• SHOOTING METHOD: HAND-HELD (HAND-HELD / TRIPOD / ALL)

• FAILURE IMAGE REMOVAL: TYPE No. 1, ...

• GOOD IMAGE EXTRACTION: TYPE No. 2, ...

Figure 17:
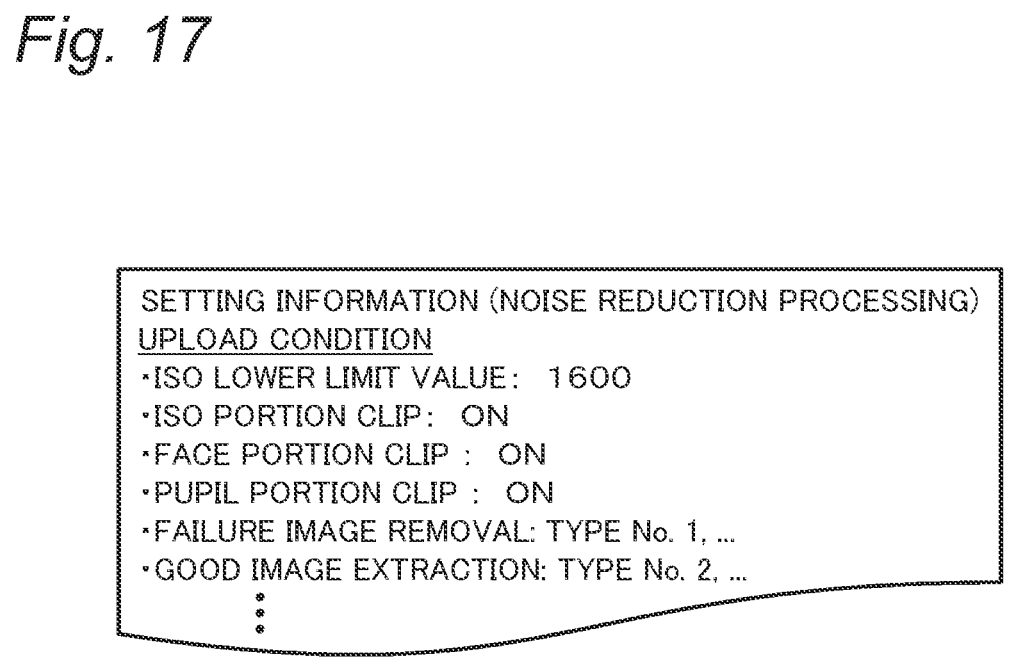

SETTING INFORMATION (NOISE REDUCTION PROCESSING)
UPLOAD CONDITION
・ISO LOWER LIMIT VALUE :   1600
・ISO PORTION CLIP :   ON
・FACE PORTION CLIP  :   ON
・PUPIL PORTION CLIP  :   ON
・FAILURE IMAGE REMOVAL: TYPE No. 1, ...
・GOOD IMAGE EXTRACTION: TYPE No. 2, ...
          ⋮

*Fig. 18*

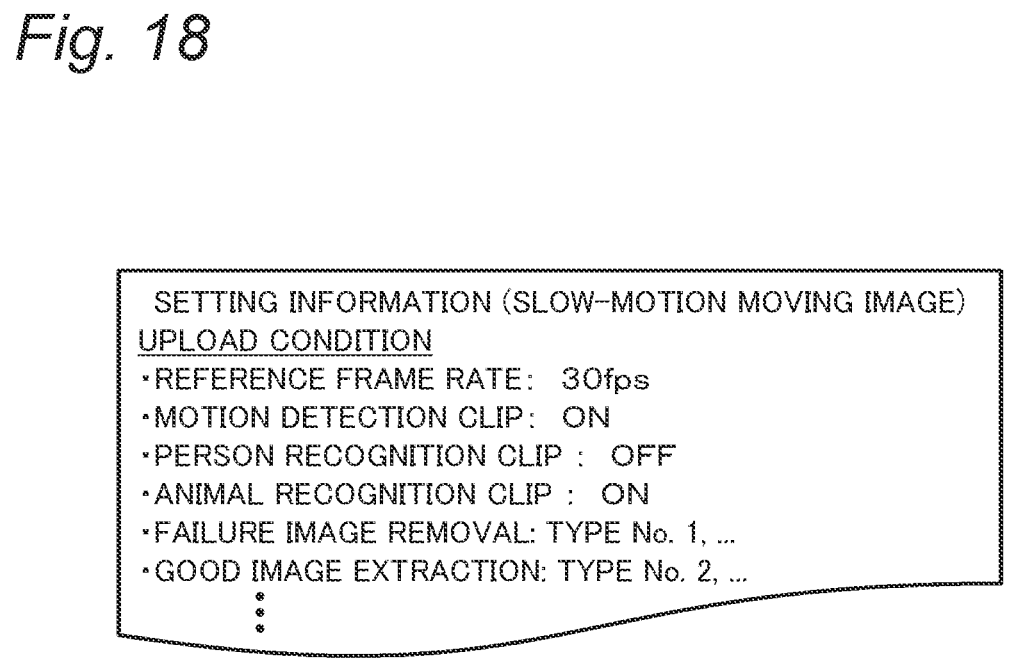

SETTING INFORMATION (SLOW-MOTION MOVING IMAGE)
UPLOAD CONDITION
·REFERENCE FRAME RATE:  30fps
·MOTION DETECTION CLIP:  ON
·PERSON RECOGNITION CLIP :  OFF
·ANIMAL RECOGNITION CLIP :  ON
·FAILURE IMAGE REMOVAL: TYPE No. 1, ...
·GOOD IMAGE EXTRACTION: TYPE No. 2, ...

Fig. 19

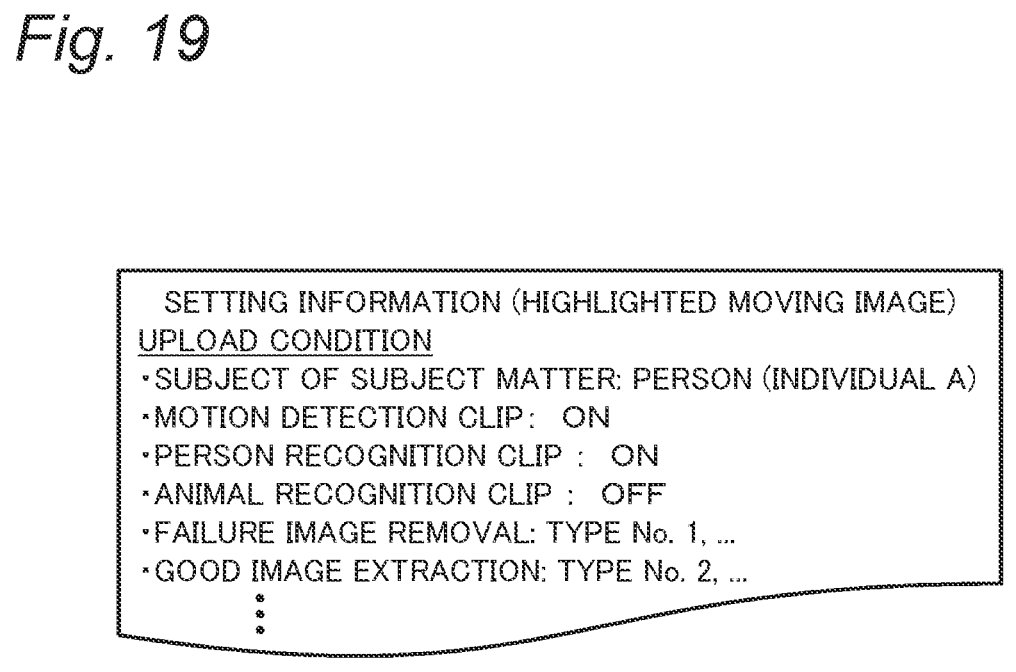

SETTING INFORMATION (HIGHLIGHTED MOVING IMAGE)
UPLOAD CONDITION
・SUBJECT OF SUBJECT MATTER: PERSON (INDIVIDUAL A)
・MOTION DETECTION CLIP:　ON
・PERSON RECOGNITION CLIP :　ON
・ANIMAL RECOGNITION CLIP :　OFF
・FAILURE IMAGE REMOVAL: TYPE No. 1, ...
・GOOD IMAGE EXTRACTION: TYPE No. 2, ...

*Fig. 21*

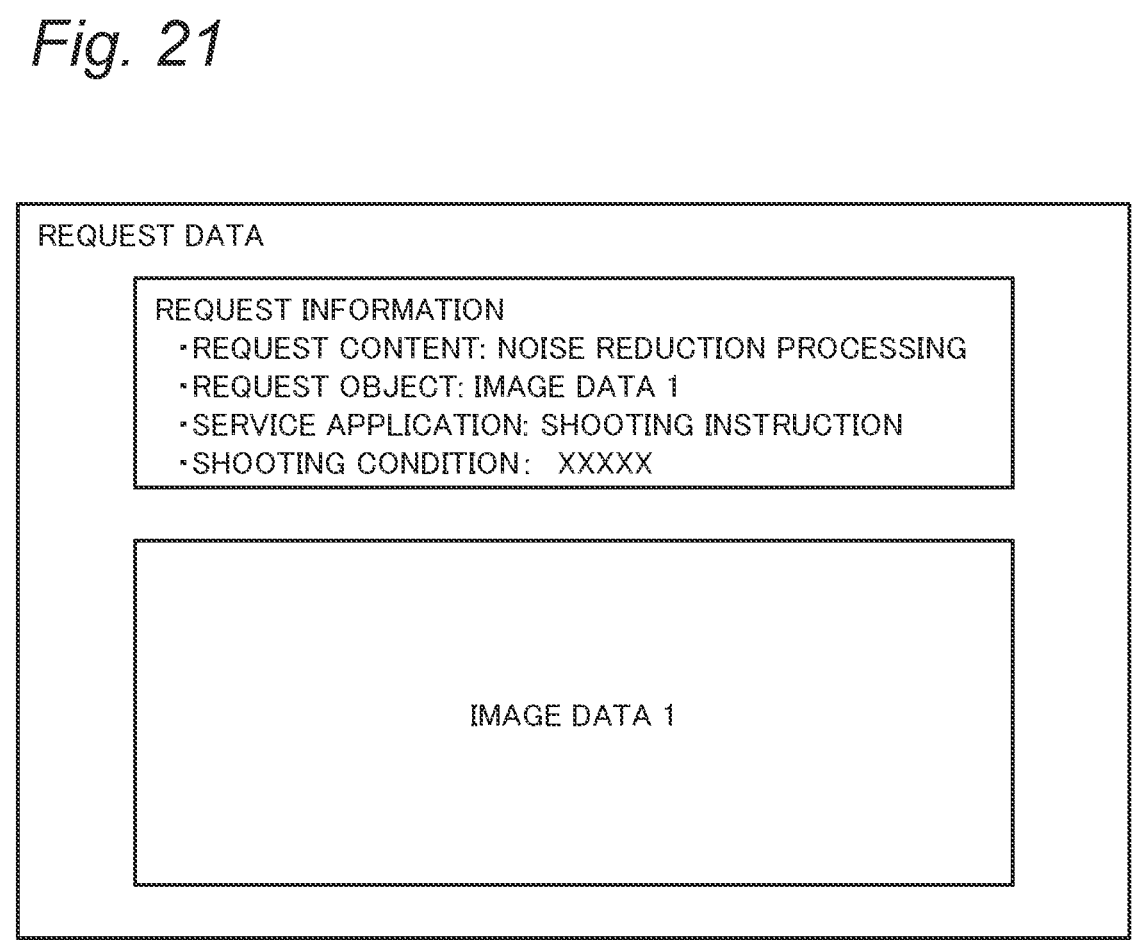

REQUEST DATA

REQUEST INFORMATION
  ・REQUEST CONTENT: NOISE REDUCTION PROCESSING
  ・REQUEST OBJECT: IMAGE DATA 1
  ・SERVICE APPLICATION: SHOOTING INSTRUCTION
  ・SHOOTING CONDITION:   XXXXX

IMAGE DATA 1

IMAGING APPARATUS AND IMAGING SYSTEM

TECHNICAL FIELD

The present disclosure relates to an imaging apparatus and an imaging system that perform data communication with an image processing apparatus.

BACKGROUND ART

JP 2021-71989 A discloses an image processing apparatus intended to appropriately request an external device to perform image processing. The image processing apparatus includes an image processing means that applies image processing to image data and a communicating means that communicates with an external device, and controls whether image processing for image data is applied by the image processing means or by the external device on the basis of content of applied image processing or an amount of data in communication with the external device.

SUMMARY

The present disclosure provides an imaging apparatus and an imaging system capable of reducing load on a system that requests image processing from the imaging apparatus according to an intention of the user.

An imaging apparatus according to the present disclosure provides an imaging apparatus including a communication interface that communicates data with an image processing apparatus connected via a communication network, an image sensor that captures a subject image to generate image data, a controller that transmits the image data to the image processing apparatus via the communication interface, to request image processing for the image processing apparatus on the image data, and a setting interface that acquires setting information on a request for image processing, according to user operation. Based on the setting information acquired with the user operation, the controller limits specific image data from the image data generated by the image sensor, and requests, to the image processing apparatus, specific image processing thereon.

An imaging system according to the present disclosure includes the imaging apparatus and an image processing apparatus that is connected to the imaging apparatus via the communication network, to perform the image processing requested by the imaging apparatus on image data received from the imaging apparatus.

According to the imaging apparatus and the imaging system of the present disclosure, it is possible to reduce load of a system that requests image processing from the imaging apparatus according to an intention of the user.

BRIEF DESCRIPTION OF DRAWINGS

FIG. 5 is a diagram illustrating a display example of a setting screen in the digital camera;

FIG. 6 is a diagram exemplifying request data by the digital camera;

FIG. 8 is a diagram illustrating an example of setting information of an upload condition in the digital camera according to the first embodiment;

FIG. 9 is a diagram exemplifying a setting screen of failure image removal in the digital camera;

FIG. 10 is a diagram exemplifying a setting screen of a good image extraction in the digital camera;

FIG. 13 is a diagram illustrating a variation of the setting information of an upload condition in the digital camera according to the first embodiment;

FIG. 14 is a diagram illustrating another variation of the setting information of an upload condition in the digital camera according to the first embodiment;

FIG. 17 is a diagram illustrating an example of the setting information of an upload condition in the digital camera according to the second embodiment;

FIG. 18 is a diagram illustrating a variation of the setting information of an upload condition in the digital camera according to the second embodiment;

FIG. 19 is a diagram illustrating another variation of the setting information of an upload condition in the digital camera according to the second embodiment;

FIG. 21 is a diagram for explaining a variation of the imaging system.

DETAILED DESCRIPTION

Hereinafter, an embodiment will be described in detail with reference to the drawings as appropriate. However, more detailed description than necessary may be omitted. In addition, the accompanying drawings and description below are provided to enable those skilled in the art to sufficiently understand the present disclosure, which does not intend to limit the claimed subject matter.

First Embodiment

1. Configuration

An imaging system according to a first embodiment of the present disclosure will be described with reference to FIG. 1.

Figure 1:
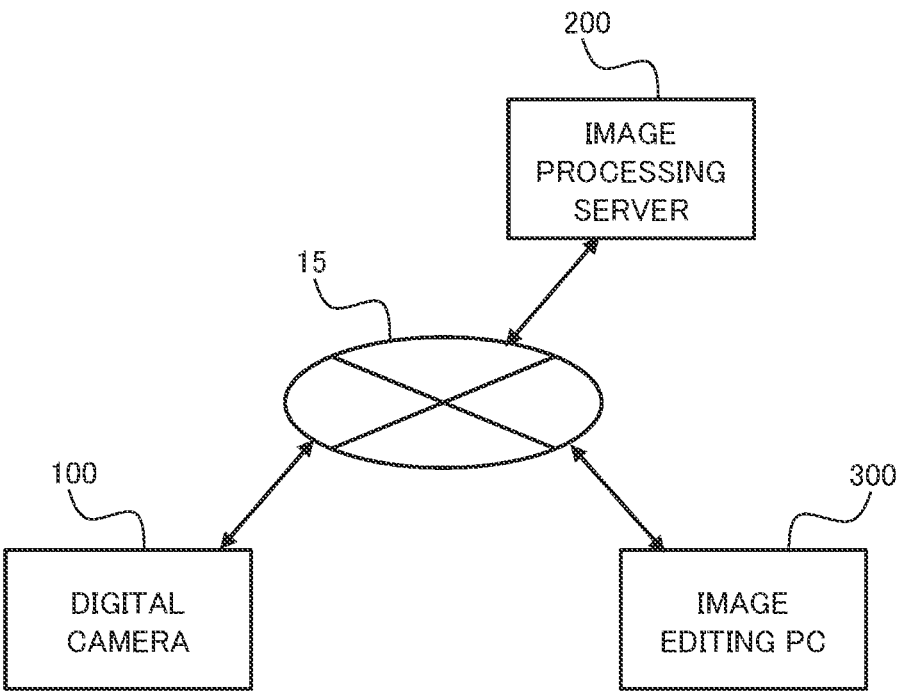
FIG. 1 is a diagram for explaining an imaging system according to a first embodiment of the present disclosure.

As illustrated in FIG. 1, an imaging system 10 according to the present embodiment includes a digital camera 100, an image processing server 200, and an image editing personal computer (PC) 300, for example. In the present system 10, the image processing server 200 is e.g. a cloud server, and is data-communicably connected to the digital camera 100 and the image editing PC 300 via a communication network 15 such as the Internet. The digital camera 100 and the image editing PC 300 may be connected to each other in a wired or wireless manner in a manner that data communication can be performed.

For example, the present system 10 is used to transmit (i.e., upload) image data captured by the digital camera 100 by the user to the image processing server 200 and cause the image processing server 200 to perform desired image processing. For example, the user can access the image processing server 200 by the image editing PC 300 and receive (i.e., download) processed image data from the image processing server 200.

For example, the present system 10 is configured such that the digital camera 100 has relatively low image processing performance, and the image processing server 200 has relatively high image processing performance. According to the present system 10, a configuration for executing advanced image processing can be omitted from the digital camera 100, and a device configuration of the digital camera 100 can be simplified. The user does not need to upload a shooting result that does not require advanced image processing by the image processing server 200 in particular from the digital camera 100. The image processing server 200 is an example of an image processing apparatus in the present system 10.

In the present system 10, the image editing PC 300 may be omitted. For example, the digital camera 100 may have a function of downloading and the like similarly to the image editing PC 300 described above. Alternatively, the image editing PC 300 may be an example of the image processing apparatus. The image editing PC 300 and the image processing server 200 may be integrally configured.

1-1. Configuration of Digital Camera

A configuration of the digital camera 100 in the present embodiment will be described with reference to FIG. 2.

Figure 2:
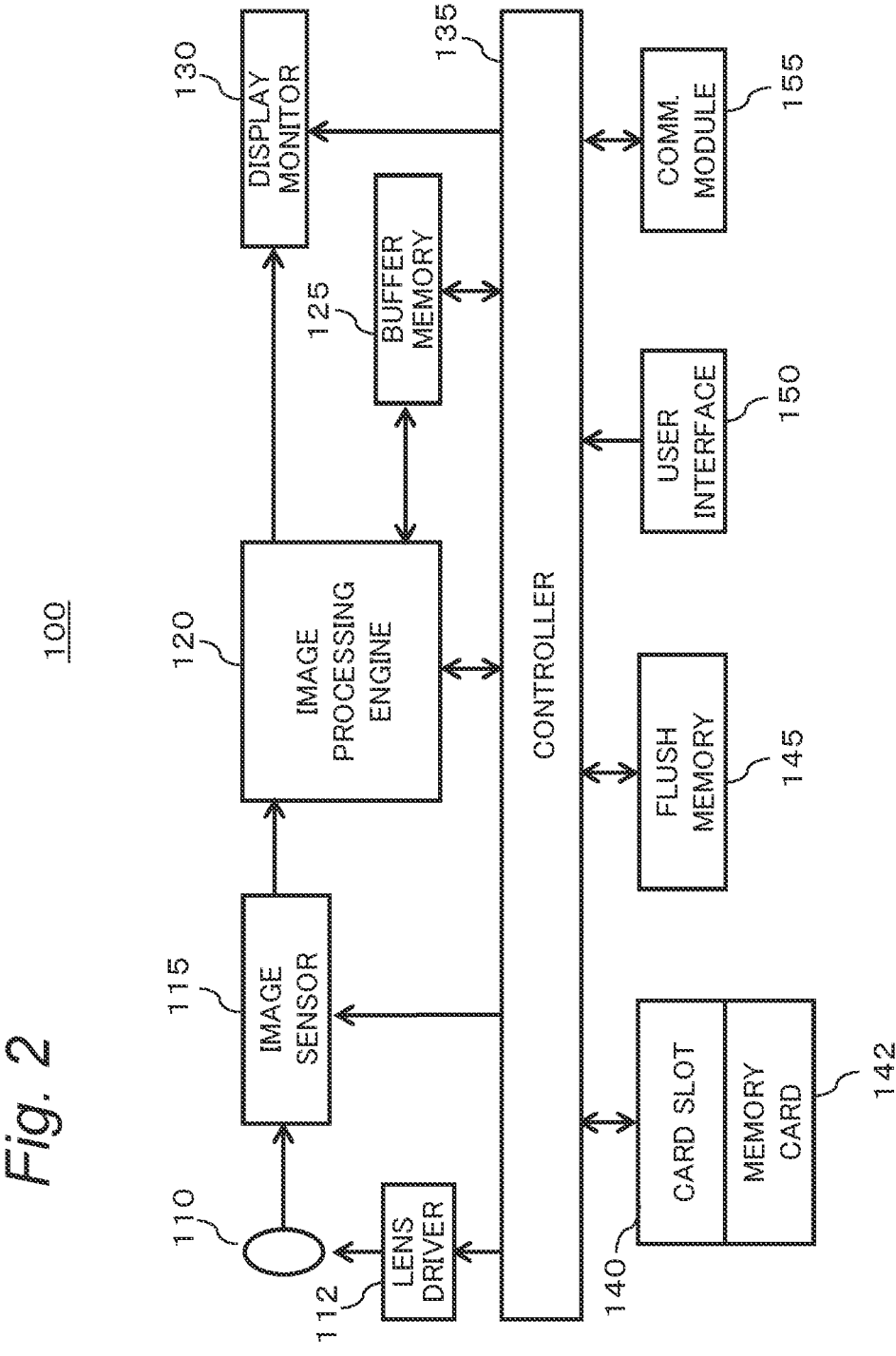
FIG. 2 is a diagram exemplifying a configuration of a digital camera in the imaging system.

FIG. 2 is a diagram illustrating a configuration of the digital camera 100 in the present system 10. The digital camera 100 is an example of the imaging apparatus in the present embodiment. The digital camera 100 according to the present embodiment includes an image sensor 115, an image processing engine 120, a display monitor 130, and a controller 135. Furthermore, the digital camera 100 includes a buffer memory 125, a card slot 140, a flash memory 145, a user interface 150, and a communication module 155. For example, the digital camera 100 includes an optical system 110 and a lens driver 112.

The optical system 110 includes a focus lens, a zoom lens, an optical image stabilizer (OIS), an aperture, a shutter, and the like. The focus lens is a lens for changing a focus state of a subject image formed on the image sensor 115. The zoom lens is a lens for changing magnification of a subject image formed by the optical system. Each of the focus lens and the like includes one lens or a plurality of lenses.

The lens driver 112 drives a focus lens and the like in the optical system 110. The lens driver 112 includes a motor, and moves the focus lens along an optical axis of the optical system 110 based on control of the controller 135. A configuration for driving the focus lens in the lens driver 12 can be realized by a DC motor, a stepping motor, a servo motor, an ultrasonic motor, or the like.

The image sensor 115 captures a subject image formed via the optical system 110 to generate imaging data. The imaging data constitutes image data indicating an image captured by the image sensor 115. The image sensor 115 generates image data of anew frame at a predetermined frame rate (e.g., 30 frames/second). A generation timing of imaging data and electronic shutter operation in the image sensor 115 are controlled by the controller 135. As the image sensor

115, various image sensors such as a CMOS image sensor, a CCD image sensor, or an NMOS image sensor can be used.

The image sensor 115 execute capturing operation of a still image, a capturing operation of a through image, and the like. The through image is mainly a moving image, and is displayed on the display monitor 130 in order for the user to determine a composition for capturing a still image. Each of a through image and a still image is an example of a captured image in the present embodiment. The image sensor 115 is an example of an image sensor in the present embodiment.

The image processing engine 120 performs various processing on imaging data output from the image sensor 115 to generate image data, and performs various processing on image data to generate an image to be displayed on the display monitor 130.

Examples of various processing include white balance correction, gamma correction, YC conversion processing, electronic zoom processing, compression processing, expansion processing, and the like, but the various processing are not limited to these. The image processing engine 120 may be configured by a hard-wired electronic circuit, or may be configured by a microcomputer using a program, a processor, or the like.

According to the present system 10, the image processing engine 120 of the digital camera 100 can be configured with image processing performance lower than image processing performance of the image processing server 200. By the above, it is easy to configure the digital camera 100 by applying a system on chip (SOC) or the like, and the configuration of the digital camera 100 can be simplified, for example. The image processing engine 120 may be configured integrally with the controller 135, or the image processing engine 120 may be omitted from the digital camera 100.

The display monitor 130 is an example of a display that displays various information. For example, the display monitor 130 displays an image (through image) indicated by image data captured by the image sensor 115 and subjected to image processing by the image processing engine 120. The display monitor 130 displays a menu screen or the like for the user to perform various settings on the digital camera 100. The display monitor 130 can be configured by a liquid crystal display device or an organic EL device, for example.

The user interface 150 is a general term for hard keys such as an operation button and an operation lever provided on the exterior of the digital camera 100, and receives operation by the user. For example, the user interface 150 includes a release button, a mode dial, and a touch panel. When receiving operation by the user, the user interface 150 transmits an operation signal corresponding to user operation to the controller 135. The user interface 150 is an example of a setting interface of the digital camera 100 in the present embodiment.

The controller 135 integrally controls entire operation of the digital camera 100. The controller 135 includes a CPU and the like, and the CPU executes a program (software) to realize a predetermined function. The controller 135 may include, instead of the CPU, a processor including a dedicated electronic circuit designed to realize a predetermined function. That is, the controller 135 can be realized by various processors such as a CPU, an MPU, a GPU, a DSP, an FPGA, and an ASIC. The controller 135 may include one or a plurality of processors. The controller 135 may include one semiconductor chip together with the image processing engine 120 and the like.

The buffer memory 125 is a recording medium that functions as a work memory of the image processing engine 120 and the controller 135. The buffer memory 125 is realized by a dynamic random access memory (DRAM) or the like. The flash memory 145 is a nonvolatile recording medium. Although not illustrated, the controller 135 may include various internal memories, and for example, may incorporate a ROM. The ROM stores various programs to be executed by the controller 135. The controller 135 may incorporate a RAM that functions as a work area of a CPU.

The card slot 140 is a means into which a removable memory card 142 is inserted. The memory card 142 can be connected to the card slot 140 electrically and mechanically. The memory card 142 is an external memory including a recording element such as a flash memory in the inside. The memory card 142 can store data such as image data generated by the image processing engine 120.

The communication module 155 is a module (circuit) that connects to an external device according to a predetermined communication standard in wired or wireless communication. For example, the predetermined communication standard includes USB, HDMI, IEEE 802.11, Wi-Fi, Bluetooth, and the like. The digital camera 100 can communicate with another device via the communication module 155.

1-2. Configuration of Image Processing Server

A configuration of the image processing server 200 in the present embodiment will be described with reference to FIG. 3.

Figure 3:
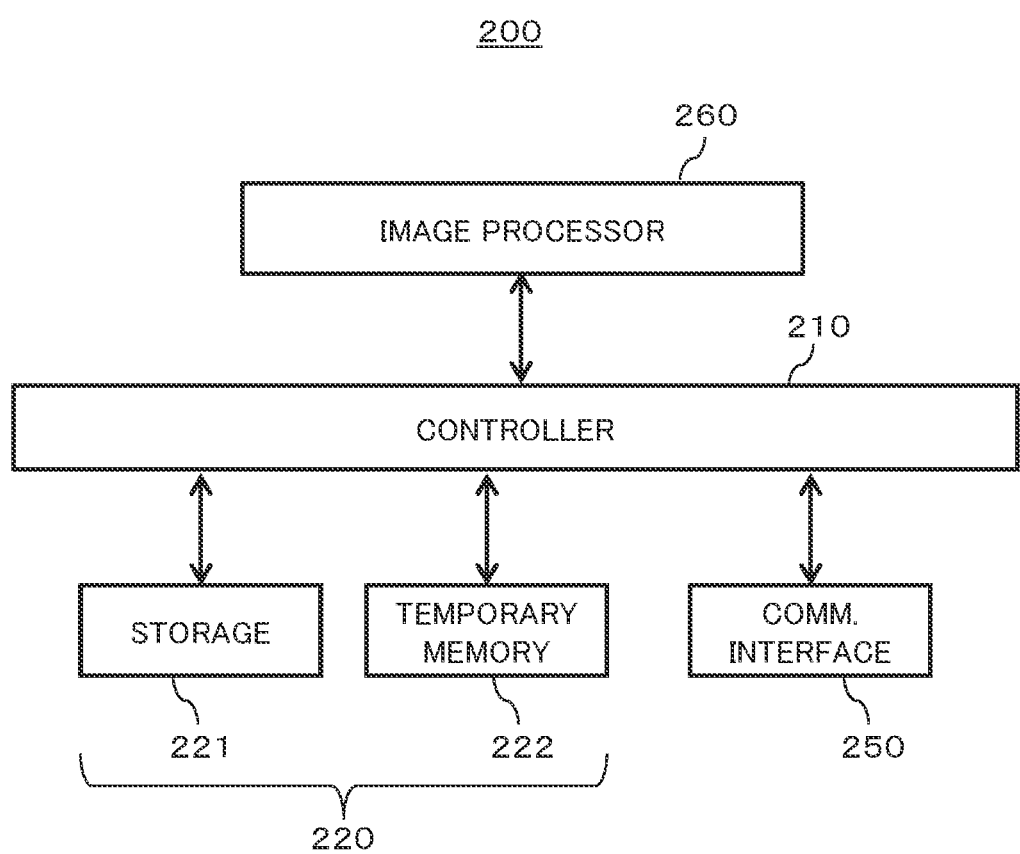
FIG. 3 is a diagram exemplifying a configuration of an image processing server in the imaging system.

FIG. 3 is a diagram exemplifying a configuration of the image processing server 200. The image processing server 200 exemplified in FIG. 3 includes a controller 210, a memory 220, a communication interface 250, and an image processor 260.

The controller 210 includes a CPU or an MPU that realizes a predetermined function in cooperation with software, for example. The controller 210 controls overall operation of the image processing server 200, for example. The controller 210 reads data and a program stored in the memory 220 and performs various arithmetic processing to realize various functions.

For example, the controller 210 executes a program including a command group for realizing each of the above-described functions. The above program may be provided from the communication network 15, or may be stored in a portable recording medium. The controller 210 may be a hardware circuit such as a dedicated electronic circuit or a reconfigurable electronic circuit designed to realize each of the above-described functions. The controller 210 may include various semiconductor integrated circuits such as a CPU, an MPU, a GPU, a GPGPU, a TPU, a microcomputer, a DSP, an FPGA, and an ASIC.

The memory 220 is a storage medium that stores a program and data necessary for implementing a function of the image processing server 200. As illustrated in FIG. 3, the memory 220 includes a storage 221 and a temporary memory 222.

The storage 221 stores a parameter, data, a control program, and the like for realizing a predetermined function. For example, the storage 221 includes an HDD or an SSD. For example, the storage 221 stores the above-described program, various image data, and the like.

For example, the temporary memory 222 includes a RAM such as a DRAM or an SRAM, and temporarily stores (i.e., holds) data. For example, the temporary memory 222 holds image data being edited. The temporary memory 222 may function as a work area of the controller 210, and may be configured by a storage area in an internal memory of the controller 210.

The communication interface 250 is a module (circuit) that connects to an external device according to a predetermined communication standard in wired or wireless communication. For example, the predetermined communication standard includes USB, HDMI, IEEE 802.11, Wi-Fi, Bluetooth, and the like. The communication interface 250 may connect the image processing server 200 to a communication network such as the Internet. The communication interface 250 is an example of an input interface that receives various pieces of information from an external device or a communication network.

The image processor 260 of the present system 10 has higher image processing performance than the image processing engine 120 of the digital camera 100, for example. The image processor 260 performs various image processing on image data received from the communication interface 250 to generate processed image data, for example. Various image processing that can be executed by the image processor 260 include image processing more advanced than image processing that can be executed by the image processing engine 120 of the digital camera 100. The image processor 260 may be configured by a hard-wired electronic circuit, or may be configured by a microcomputer using a program, a processor, or the like.

The configuration of the image processing server 200 as described above is an example, and the configuration of the image processing server 200 is not limited to this. For example, the controller 210 and the image processor 260 may be integrally configured. The input interface in the image processing server 200 may be realized by cooperation with various software in the controller 210 and the like. An input interface in the image processing server 200 may acquire various information by reading various information stored in various storage media (e.g., the storage 221) to a work area (e.g., the temporary memory 222) of the controller 210.

2. Operation

Operation of the imaging system 10 of the present embodiment configured as described above will be described below.

In the present system 10, the digital camera 100 uploads image data of a shooting result by the user to the image processing server 200 in order to request image processing desired by the user, for example. For example, when the user of the present system 10 returns home after shooting an image with the digital camera 100 outdoors, the user can access the image processing server 200 from the image editing PC 300 to obtain image data for which image processing for a shooting result has been performed.

On the other hand, when all shooting results by the user are uploaded as objects for requesting image processing to the image processing server 200, it is concerned that system load such as communication load between the digital camera 100 and the image processing server 200 or processing load of the image processing server 200 is excessive. For example, when some image processing can be executed in real time in the digital camera 100 without requesting the image processing server 200, and it may be desirable for the user to perform such image processing in the digital camera 100.

Therefore, in the present system 10, the digital camera 100 operates so as to narrow down image data as a request object to the image processing server 200 according to an intention of the user from shooting results obtained by the user using the digital camera 100. Details of operation of the present system 10 will be described below.

2-1. Overall Operation

Operation of the digital camera 100 in the present system 10 will be described with reference to FIGS. 4 to 6.

First, the controller 135 of the digital camera 100 receives operation of a setting screen or the like by the user on the user interface 150 and sets an upload condition (S1). The upload condition is a condition under which image data is uploaded in order to request the image processing server 200 to perform various image processing. FIG. 5 illustrates an example of a setting screen in the upload condition setting processing (S1).

Figure 5:
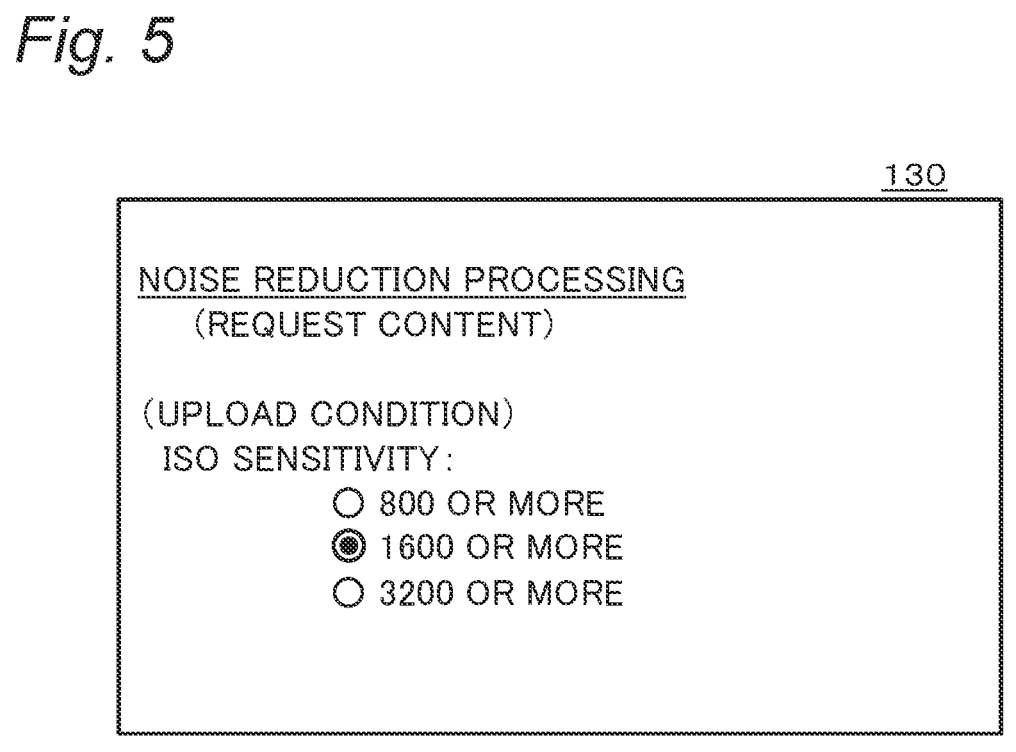

FIG. 5 exemplifies a setting screen related to a request for noise reduction processing. The noise reduction processing is image processing of reducing noise in an image (moving image or still image) of a shooting result by temporal or spatial image analysis. In the example of FIG. 5, the display monitor 130 of the digital camera 100 displays a setting screen including a lower limit option such as ISO sensitivity of "800 or more", "1600 or more", and "3200 or more" for an upload condition of the noise reduction processing. The digital camera 100 receives user operation for an option of a setting screen and the like on the user interface 150 such as a touch panel or various buttons.

In image shooting by the digital camera 100, noise generally tends to increase as the ISO sensitivity is higher. In view of this, in the present embodiment, it is assumed that the user considers noise as a problem in an image shot with relatively high ISO sensitivity, but does not consider noise as a problem in an image shot with relatively low ISO sensitivity. The lower limit of ISO sensitivity, for which noise reduction is desired, can vary depending on the user's subjectivity, a shooting scene, and the like.

In view of the above, in the digital camera 100 of the present embodiment as illustrated in FIG. 5, the controller 135 presents the user with an option of a lower limit value of ISO sensitivity for performing the noise reduction processing on the display monitor 130, for example. Then, the controller 135 stores an ISO lower limit value selected by user operation on the user interface 150 in setting information of an upload condition (S1).

In the example of FIG. 5, a case where an ISO lower limit value of "1600" is set as an upload condition according to user operation is exemplified. A method of selecting an ISO lower limit value is not particularly limited to the example of FIG. 5, and may be numerical value input by the user, for example. In the present embodiment, the upload condition is not limited to the example of FIG. 5, and is an example of a request condition including a condition unique to various image processing and a common condition, for example. Details of the upload condition setting processing (S1) will be described later.

After the above, the controller 135 executes image shooting desired by the user as needed according to various operation of the digital camera 100 for image shooting by the user (S2). The image shooting in Step S2 may be still image shooting or moving image shooting. For example, the controller 135 controls ISO sensitivity for image shooting as needed and causes the image sensor 115 to capture a subject image. The controller 135 causes the image processing engine 120 in the digital camera 100 to process image data generated by the image sensor 115 or records the image data in the memory card 142 via the card slot 140 as necessary.

After the above, on the basis of the set upload condition (S1) and a result of the image shooting (S2), the controller 135 performs selection to narrow down image data to be uploaded as an object for requesting image processing to the image processing server 200 (S3).

In the request object selection processing (S3) in the example of FIG. 5, image data for which the image shooting (S2) is performed with ISO sensitivity of a set ISO lower limit value "1600" or more is selected as a request object of the noise reduction processing, for example. On the other hand, when the image shooting (S2) is performed below the ISO lower limit value, image data of a result of the shooting is excluded from a request object of the noise reduction processing. In this way, it is possible to reduce an unnecessary request for image processing in accordance with an intention that the user may view noise as a problem and to reduce system load. In the present embodiment, the request object selection processing (S3) is performed for various image processing. Details of the processing of Step S3 will be described later.

After the above, as a result of the request object selection processing (S3), the controller 135 determines whether or not image data selected as a request object is present (S4). A timing of performing the processing in Steps S3 and S4 may be after one time of image shooting or after a plurality of times of image shooting.

In a case where image data as a request object is present (YES in S4), the controller 135 controls the communication module 155 to transmit data for requesting image processing to the image processing server 200 via the communication network 15 (S5). FIG. 6 illustrates request data uploaded in Step S5. For example, the request data includes request information indicating request content, that is, a type of image processing to be requested, and image data as a request object.

Figure 4:
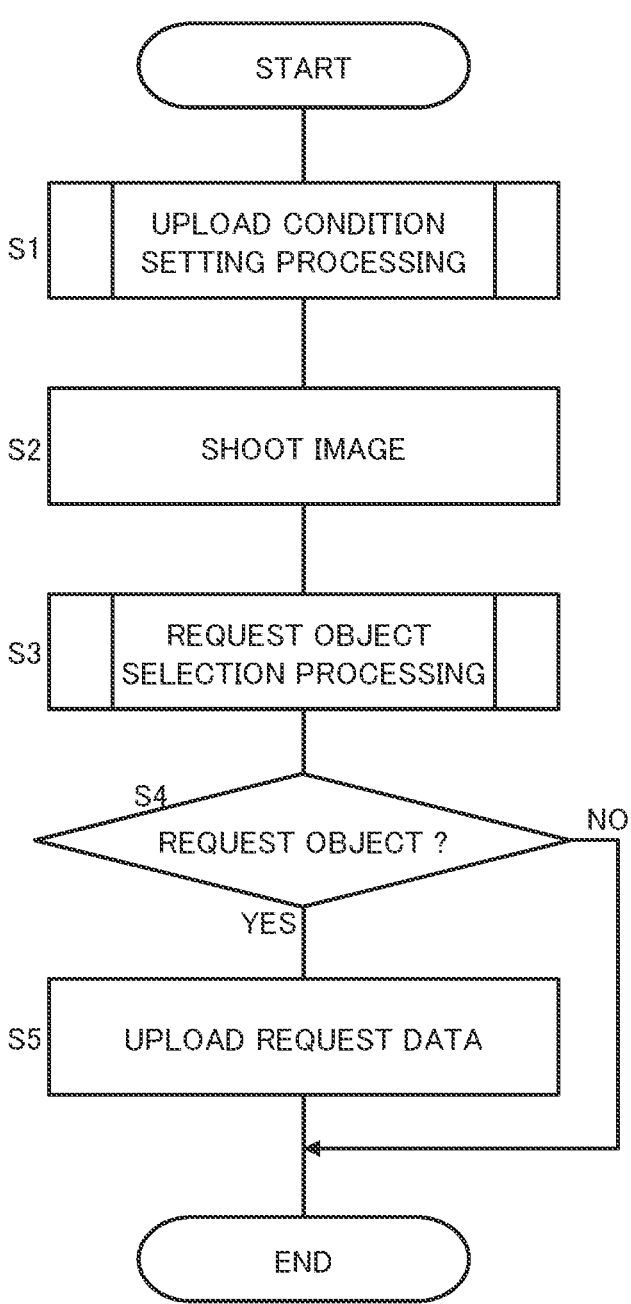
FIG. 4 is a flowchart exemplifying operation of the digital camera in the imaging system.

After uploading (S5) for requesting the image processing server 200, the controller 135 ends the processing illustrated in the flowchart of FIG. 4, for example. In a case where no image data is present as a request object (NO in S4), the controller 135 ends the processing illustrated in FIG. 4, in particular, without uploading image data to the image processing server 200. The controller 135 repeats the processing illustrated in the present flowchart at a predetermined cycle, for example. At this time, input of user operation in Step S1 can be appropriately omitted by use of a result of Step S1 in the first time, for example.

According to the above processing, the digital camera 100 of the present system 10 sets, before the image shooting (S2), an upload condition according to user operation (S1), and after the image shooting (S2), selects a request object according to an intention of the user (S3). By the above, the present system 10 can realize narrowing down of image processing requests to the image processing server 200 so as to reflect an intention of the user, and reduce system load.

In the present system 10, a plurality of ISO lower limit values of the above-described upload condition may be set as a lower limit value for a person and a lower limit value for a thing other than a person, for example. For example, in Step S1, an ISO lower limit value for a person may be set to be lower than an ISO lower limit value for a thing other than a person by user operation or automatic determination of the digital camera 100. In this case, in Step S3, the digital camera 100 switches and uses a plurality of lower limit values, based on a result of image recognition of a person, for example.

The digital camera 100 of the present system 10 may prompt the user to confirm uploading before uploading request data (S5). For example, between Step S3 and Step S4 described above, the controller 135 may cause the display monitor 130 to display a display screen or the like for confirming with the user that image data selected as a request object is to be uploaded. At this time, the digital camera 100 may receive operation in which the user stops uploading presented image data or changes image data as a request object.

2-2. Upload Condition Setting Processing

Figure 7:
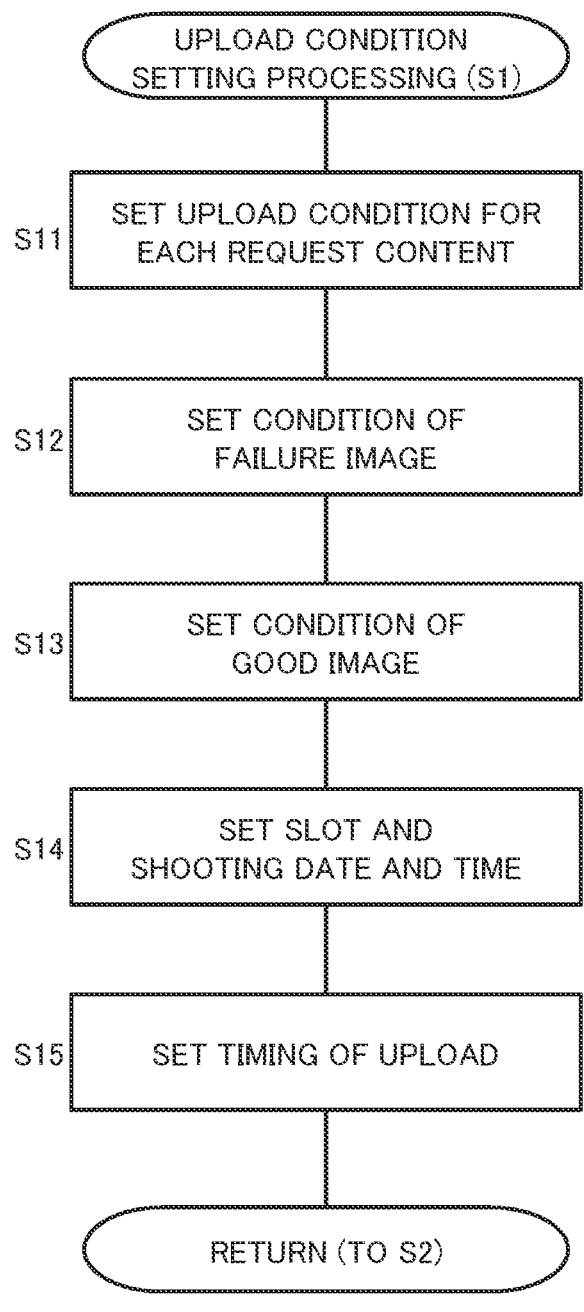
FIG. 7 is a flowchart exemplifying setting processing of an upload condition in the digital camera according to the first embodiment.

The upload condition setting processing in Step S1 in FIG. 4 will be described with reference to FIG. 7.

For example, the controller 135 of the digital camera 100 receives user operation of a setting screen and the like on the user interface 150, and sets an individual upload condition according to request content of image processing such as the example of FIG. 5 (S11). FIG. 8 illustrates setting information of an upload condition set in the present example. For example, as request content of image processing, noise reduction processing, noise addition processing, high-resolution composition processing, image processing of a slow-motion moving image, image processing of a highlighted moving image, and the like can be set (details will be described later).

In the digital camera 100 according to the present embodiment, in addition to setting of an upload condition for each request content of image processing (S11), the controller 135 sets an upload condition common to various image processing (S12 to S15).

For example, the digital camera 100 of the present embodiment can set a function of removing image data of an image of which shooting by the user fails, that is, a failure image, from a request object uploaded to the image processing server 200 (S12). A setting screen in Step S12 is exemplified in FIG. 9.

For example, in the example of FIG. 9, the display monitor 130 displays a check box for each type of a failure image in a state where a function of failure image removal is turned ON (enabled). Types of the failure image include an "extremely overexposed image", an "extremely underexposed image", a "significantly blurred image", an "out-of-focus image", an "image inclined in a horizontal direction", and an "image in which a subject closes his or her eyes".

For example, in the example of FIG. 9, the user can input operation of selecting one or a plurality of types of desired failure images via a check box. In Step S12, the controller 135 receives such user operation on the user interface 150, and sets a selected type of a failure image as an upload condition as a condition of exclusion from a request object (see FIG. 8).

According to the failure image removal function set in Step S12, image data for which image shooting by the user is considered to have failed can be excluded from a request object to the image processing server 200, and system load can be reduced. By allowing the user to select such a type of a failure image (see FIG. 9), image data that the user considers as a failure image can be easily excluded from a request object. The user may turn OFF (disable) the failure image removal function by operation of the setting screen in FIG. 9, for example. Further, user selection for a type of a failure image may be omitted.

For example, the digital camera 100 according to the present embodiment can set a function of extracting image data of a good image that is an image having an excellent shooting result by the user, and uploading the image data to the image processing server 200 (S13). The setting screen in Step S13 is exemplified in FIG. 10.

Figure 10:
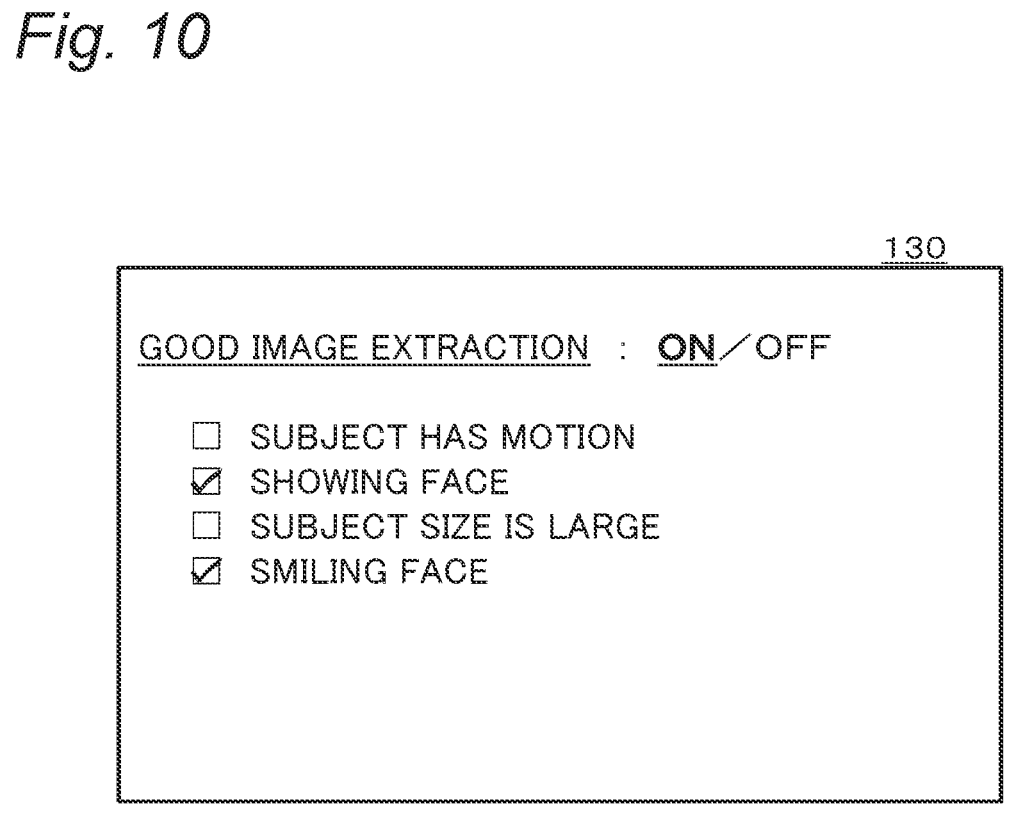

For example, in the example of FIG. 10, the display monitor 130 displays a check box for each type of a good image in a state where a function of extracting a good image is turned ON. For example, types of a good image include "an image in which a subject has motion", "an image in which a face appears", "an image with large subject size", and "an image with a smiling face". Types of a good image may further include an "image in which a face (or pupil) is in focus".

For example, in the example of FIG. 10, the user can input operation of selecting one or a plurality of types of desired good images via a check box. In Step S13, the controller 135 receives such user operation on the user interface 150, and sets a good image of the selected type as a requirement for a request object to an upload condition (see FIG. 8).

According to the function of extracting a good image set in Step S13, a request object uploaded to the image processing server 200 can be limited to image data having an excellent shooting result, and system load can be easily reduced according to an intention of the user. By allowing the user to select such a type of a good image (see FIG. 10), image data that the user considers as a good image can be easily included in a request object.

The digital camera 100 according to the present embodiment may set a slot of a recording medium such as the card slot 140 of the memory card 142 to an upload condition (S14). The upload condition indicates a recording destination of image data that may be a request object.

For example, the controller 135 of the digital camera 100 may present an option such as "Slot 1", "Slot 2", or "All slots" as condition setting by the user in Step S14. Alternatively, the configuration may be such that as automatic determination by the digital camera 100, only one of Slots 1 and 2 is uploaded at the time of operation of backup recording. At the time of backup recording, since the same image data is recorded in both of Slots 1 and 2, it is possible to avoid superimposition of data to be uploaded by the above automatic determination.

The digital camera 100 according to the present embodiment may set, to an upload condition, a range of shooting dates and times of image data that may be a request object to the image processing server 200 (S14). For example, in Step S14, the controller 135 may present an option such as "only on the day", "latest one week", "latest one hour", or the like as condition setting by the user.

According to the setting in Step S14, for example in the flowchart of FIG. 4, image data as an object of request object selection processing (S3 in FIG. 4) is recorded from a slot set to an upload condition, and is limited to image data having shooting date and time within a set range. In addition to (or instead of) such user setting, the controller 135 of the digital camera 100 may upload only image data having a difference from that at the time of previous uploading.

The digital camera 100 according to the present embodiment may set, to an upload condition, a timing for executing upload to the image processing server 200 (S15). For example, in Step S14, the controller 135 may present an option such as "always during shooting", "at designated time" (such as 24:00 every night), or "user manual operation" as condition setting by the user. In a case where user manual operation is selected, the digital camera 100 may be able to select image data to be uploaded from "all" or "candidate".

The controller 135 of the digital camera 100 stores the setting information (see FIG. 8) of various upload conditions set as described above in the flash memory 145 or the like, terminates the processing of setting an upload condition (S1 in FIG. 4), and proceeds to Step S2.

According to the upload condition setting processing described above, the present system 10 can perform various types of pre-setting for narrowing down request objects of image processing from the digital camera 100 to the image processing server 200 according to an intention of the user.

Such pre-setting is not limited to the above example, and for example, the digital camera 100 of the present embodiment may set rating to an upload condition. The rating is a function of receiving evaluation of image data by the user in five levels or the like. For example, the controller 135 of the digital camera 100 may receive a range such as "3 or more" or selection of one or a plurality of ratings of OFF and 1 to 5 as condition setting by user operation. For example, the controller 135 can limit image data to be uploaded by automatic determination similarly to a function of extracting a good image, with reference to the rating set to an upload condition.

The digital camera 100 according to the present embodiment may automatically determine an upload execution timing instead of the setting in Step S15. For example, the controller 135 of the digital camera 100 may detect an interval between shootings such as when no user operation is present for five minutes or more. Alternatively, such automatic determination may be performed when an upload line speed is equal to or more than a threshold, such as 5G, or only when Wi-Fi connection is established, for example. For example, communication time (i.e., a background processing period in a camera) can be shortened by limitation to a case where a line speed at a shooting site is 10 Mbps or more. By limitation to Wi-Fi connection, communication cost can be reduced.

The digital camera 100 of the present embodiment may receive setting as to whether or not to leave uploaded image data in the digital camera 100 by user operation in advance.

2-3. Request Object Selection Processing

The request object selection processing in Step S3 of FIG. 4 will be described with reference to FIG. 11.

Figure 11:
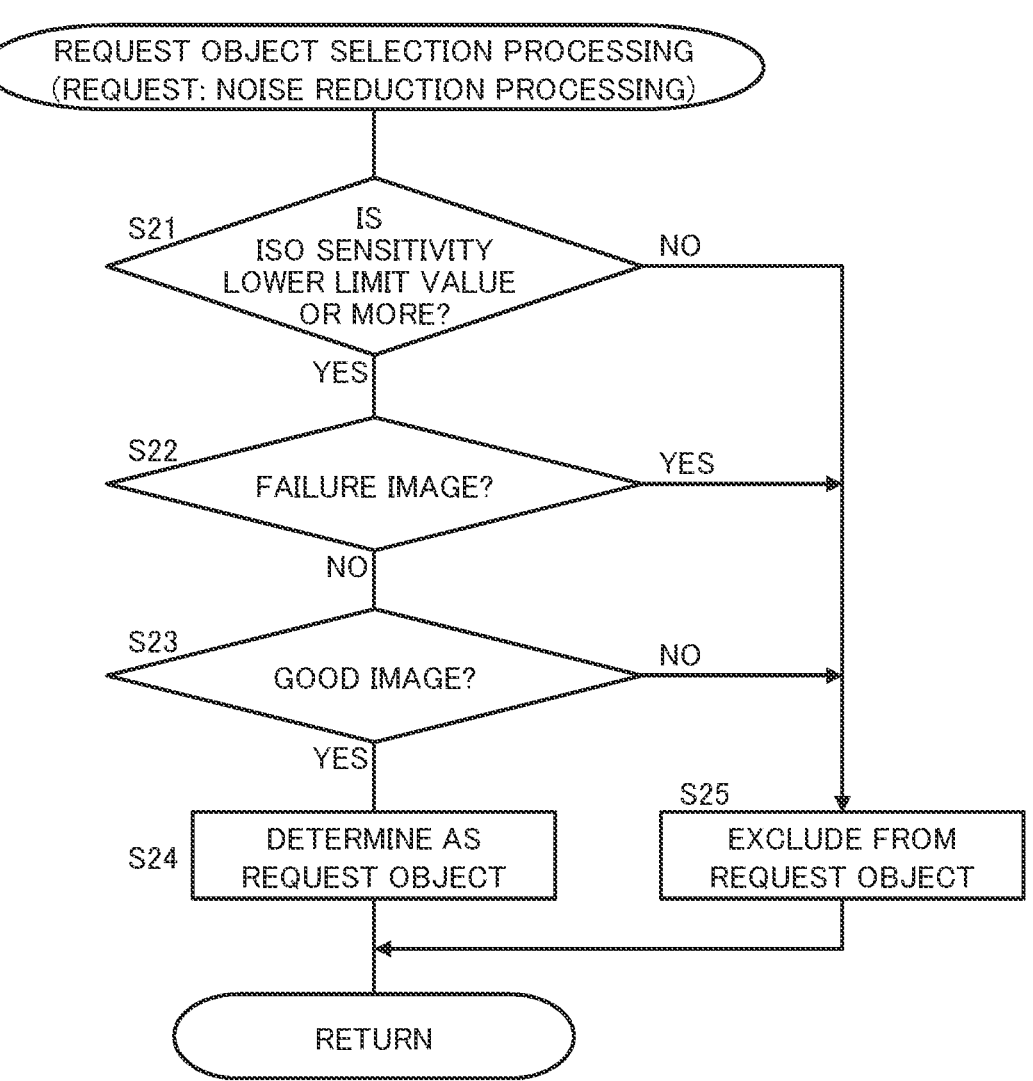
FIG. 11 is a flowchart illustrating an example of request object selection processing in the digital camera according to the first embodiment.

In FIG. 11, an example of processing in a case where request content to the image processing server 200 is noise reduction processing for image data of one file will be described. The processing illustrated in a flowchart of FIG. 11 is started at a timing set in Step S15 of the upload condition setting processing (FIG. 7), for example.

First, the controller 135 refers to setting information (e.g., FIG. 8) stored in the upload condition setting processing (S1 in FIG. 4), and determines whether or not ISO sensitivity at the time of shooting of image data is equal to or more than an ISO lower limit value set to an upload condition (S21). For example, in a case where image data indicates a moving image, the determination in Step S21 is made by comparing lowest ISO sensitivity in the moving image with an ISO lower limit value of an upload condition.

In a case where ISO sensitivity at the time of shooting of image data (S2 in FIG. 4) is less than an ISO lower limit value of an upload condition (NO in S21), the controller 135 excludes the image data from a request object without selecting the image data as a request object (S25).

Then, image data excluded from a request object as described above is not transmitted from the digital camera 100 to the image processing server 200 in subsequent Steps S4 and S5 in FIG. 4. In this way, the present system 10 can reduce system load by performing control so as not to request the image processing server 200 to perform unnecessary noise reduction processing on image data shot with ISO sensitivity at which noise is considered not to be a problem for the user.

On the other hand, in a case where ISO sensitivity at the time of shooting image data (S2 in FIG. 4) is equal to or more than an ISO lower limit value of an upload condition (YES in S21), the controller 135 determines whether or not the image data is a failure image on the basis of an upload condition set in Step S12 in FIG. 4, for example (S22).

In Step S22 for example, when image data to be determined corresponds to any of types selected by the user in the example of FIG. 9, "YES" is determined, and when the image data does not correspond to any of the types, "NO" is determined. For example the processing of Step S22 may be simple processing of calculating degree of overexposure/underexposure from a histogram of a pixel value of image data to be determined, or checking presence or absence of pupil detection, whether or not an image is in a focus, or the like from meta information or the like of the image data. Alternatively, the controller 135 may perform various image recognition on the image data.

In a case of determining that image data is a failure image (YES in S22), the controller 135 does not select the image data as a request object (S25). On the other hand, in a case of determining that image data is not a failure image (NO in S22), the controller 135 determines whether or not the image data is a good image based on an upload condition set in Step S13 in FIG. 4, for example (S23).

In Step S23 for example, when image data to be determined corresponds to any of types selected by the user in the example of FIG. 10, "YES" is determined, and when the image data does not correspond to any of the types, "NO" is determined. The processing in Step S23 may be simple processing such as checking presence or absence of face detection and pupil detection from meta information of image data to be determined, or may be various image recognition, for example. The controller 135 may refer to rating of the image data in the processing of Step S23.

In a case of determining that image data is not a good image (NO in S23), the controller 135 does not select the image data as a request object (S25). On the other hand, in a case where the controller 135 determines that image data is a good image (YES in S23), the image data satisfies all upload conditions. In such a case, the controller 135 determines to select the image data as a request object (S24).

When determining whether or not to select image data as a request object (S24, S25), the controller 135 ends the request object selection processing illustrated in the flowchart of FIG. 11 (S3 of FIG. 4). In a case where image data of a plurality of files is present as a processing object, the controller 135 executes the processing illustrated in the present flowchart for each image data of one file.

According to the request object selection processing above, the digital camera 100 can select a request object to the image processing server 200 from image data of a shooting result according to an intention of the user using an upload condition set in advance by the user.

2-4. Variation

A variation of the request object selection processing in the digital camera 100 of the present embodiment as described above will be described with reference to FIGS. 12 to 14.

2-4-1. Noise Addition Processing and Photo Style

In the present system 10, image processing requested to the image processing server 200 is not limited to noise reduction processing, and may be processing of intentionally adding noise, for example. In the noise addition processing, specific noise such as granular noise or color noise is added to a captured image from the viewpoint of atmosphere of the image or a presentation effect, for example.

Such a request for image processing may be made in conjunction with a shooting mode prepared in advance in the digital camera 100. For example, the digital camera 100 according to the present embodiment has a plurality of shooting modes prepared in advance so that the user can easily shoot an image with a desired color tone or image quality. Hereinafter, this shooting mode is referred to as a "photo style".

For example, in the digital camera 100, photo styles such as "Standard", "Vivid", "Classical", "Natural", "Monochrome", and "Monochrome (for portrait)" are prepared. "Standard" is a mode with standard setting, and "Vivid" is a mode in which saturation and contrast are high and a vivid effect can be obtained. "Classical" is a mode for producing film-like image quality. "Natural" is a mode in which a soft effect with a low contrast can be obtained. "Monochrome" and "Monochrome (for portrait)" are modes for obtaining a monochromatic effect without color.

FIG. 13 exemplifies setting information of an upload condition in the present variation. For example, the present system 10 may perform color noise addition processing on a shooting result using a predetermined photo style such as "Vivid" or "Classical", and may not perform the color noise addition processing on another shooting result using "Standard", "Natural", or the like. The present system 10 may perform granular noise addition processing on a shooting result using "Monochrome", and may not perform the granular noise addition processing on a shooting result using "Monochrome (for portrait)", for example.

Figure 12:
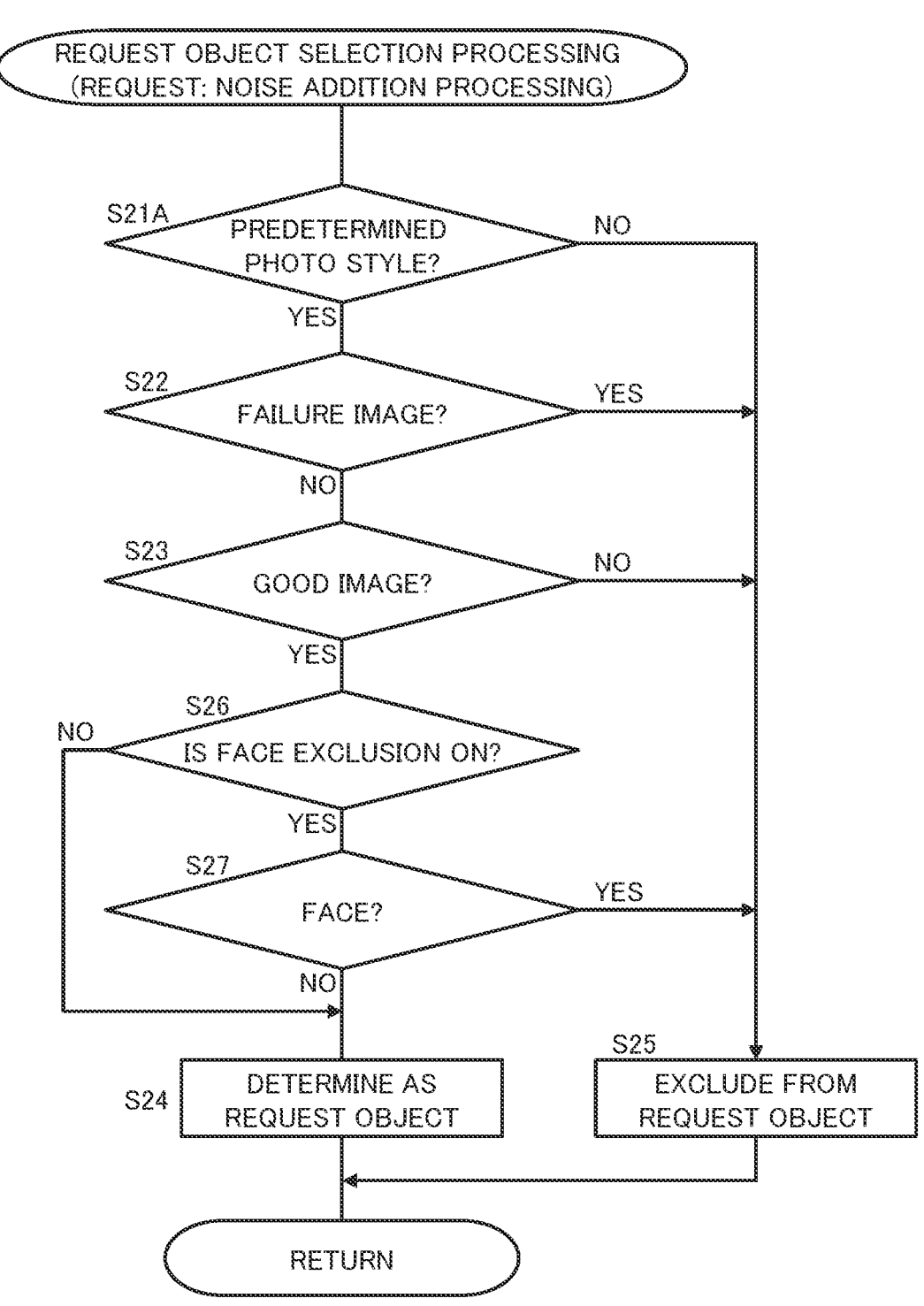
FIG. 12 is a flowchart illustrating a variation of the request object selection processing in the digital camera according to the first embodiment.

For example, instead of Step S21 in FIG. 11, the controller 135 of the digital camera 100 determines whether or not a photo style at the time of shooting is a photo style set in an upload condition (FIG. 13) as illustrated in FIG. 12 in request object selection processing for various noise addition processing (S21A). In this way, the present system 10 can add intentional noise or reduce unnecessary noise according to a purpose of each photo style.

Regarding the noise addition processing for each photo style as described above, the present system 10 may perform setting in advance according to user operation. For example, in the upload condition setting processing (FIG. 7), instead of Step S11, the controller 135 may receive, via the user interface 150, user operation of designating a photo style for performing various noise addition processing, and set an upload condition of color noise addition processing. The controller 135 may receive user operation that identifies degree to which various noise are added (e.g., high, middle, and low), and may notify about such information at the time of request to the image processing server 200.

The configuration may be such that the present system 10 does not perform the noise addition processing on an image in which a specific subject (e.g., a human face) is captured. For example, as illustrated in FIG. 13, setting information of an upload condition for the noise addition processing may include ON/OFF of setting for excluding a face image from a request object.

For example, in the upload condition setting processing (S1 in FIG. 4), the user can input operation to turn ON setting of face exclusion to the digital camera 100 in a case where the user does not want to apply noise to a face image. Then, as exemplified in FIG. 12, when setting of face exclusion is ON in the request object selection processing (YES in S26), the controller 135 of the digital camera 100 extracts image data in which no face is captured (S27) and selects the image data as a request object (S24).

Further, various noise addition processing as described above may be executed by the digital camera 100 without requested to the image processing server 200. For example, the digital camera 100 may limit a request object to image data of a moving image by executing the noise addition processing on image data of a still image and not requesting the noise addition processing on image data of a still image to the image processing server 200. An upload condition of such setting may be changeable by user operation similarly to the various conditions described above. Without limitation to the noise addition processing, image processing for obtaining various effects may be set in conjunction with a shooting mode of the digital camera 100.

2-4-2. High-Resolution Shooting

In the present system 10, processing of combining images may be requested to the image processing server 200. For example, the present system 10 may have an operation mode for performing imaging by the digital camera 100 a plurality of times and generating a high-resolution composite image by image composition processing of a plurality of obtained captured images (hereinafter referred to as "high-resolution shooting mode").

An upload condition of the image composition processing in the high-resolution shooting mode, that is, high-resolution composition processing may include the number of pixels, for example as illustrated in FIG. 14. For example, in a case where the number of pixels after composition is a predetermined threshold (upper limit value) or more, a threshold for requesting the image processing server 200 to perform high-resolution composition processing may be set in advance at the time of manufacturing and shipping of the digital camera 100 or the like. For example, the threshold can be set from the viewpoint of design restriction, performance limit, securing of reserve power during execution, or the like of the digital camera 100. The threshold of the number of pixels may be changeable in such a manner as reduction by user operation.

The upload condition of the high-resolution composition processing may include a shooting method. High-resolution shooting is performed by a method in which the digital camera 100 is fixed to a tripod or the like, or by a method in which the digital camera 100 is held by the user. The digital camera 100 according to the present embodiment can be configured such that whether to perform high-resolution composition processing in its own device or to request the image processing server 200 can be set in advance by user operation according to such a shooting method.

For example, it is conceivable that the user desires to quickly perform shooting at the time of hand-held shooting, but desires to carefully check a composition result on screen display of the digital camera 100 or the like at the time of tripod shooting. In view of the above, according to the digital camera 100 of the present embodiment, it is possible to meet the above needs by setting such that a request object is set at the time of hand-held shooting but a request object is not set at the time of tripod shooting. For example, even in a case where the digital camera 100 requires longer time for high-resolution composition processing for hand-held shooting than for high-resolution composition processing for tripod shooting, and does not accept operation during the processing, a situation in which the user cannot use the camera can be reduced by the above setting.

The image composition processing requested to the image processing server 200 in the present system 10 is not particularly limited to high-resolution composition processing. For example, in the present system 10, whether to set various image composition processing such as super-resolution composition e.g. real resolution shooting, high dynamic range (HDR) composition processing, and depth composition processing as a request object can be controlled.

In the present system 10, image processing for creating a moving image such as a slow-motion moving image or a highlighted moving image may be requested to the image processing server 200.

2-4-3. Slow-Motion Moving Image

For example, in a slow-motion moving image in which a motion of a subject or the like is reproduced slower than that at the time of shooting, it is conceivable that image processing for generating an intermediate image for interpolation between frames in a moving image of a shooting result is useful. Such image processing of interpolation requires processing time, and is requested to the image processing server 200 in the present system 10. For example, the image processing is required in a case where a frame rate at the time of shooting is relatively small, while there is considered to be a demand that the image processing can be omitted in other cases.

In view of the above, the digital camera 100 according to the present embodiment may set a frame rate serving as a reference of whether or not to be set as a request object as an upload condition of image processing for a slow-motion moving image as described above. For example, a reference frame rate of an upload condition may be set to "30 fps" in order to request the image processing server 200 to perform the above-described image processing only in a case where a frame rate at the time of moving image shooting in creating a slow-motion moving image of a ½ speed is less than 60 fps.

According to the above upload condition, the digital camera 100 of the present system 10 can request image processing of the interpolation for a moving image in which a frame rate at the time of moving image shooting is too small and becomes less than 30 fps if the moving image is directly set to a ½ speed. On the other hand, for a moving image that can secure 30 fps or more even at a ½ speed of that at the time of moving image shooting, the image processing can be omitted, and system load can be reduced. When creating a slow motion moving image at a ¼ speed in a state where the same reference frame rate (30 fps) as described above is set, the present system 10 may request the image processing server 200 to perform the image processing until the frame rate at the time of moving image shooting is less than 120 fps.

In the digital camera 100 of the present system 10, an input frame rate and an output frame rate in image processing of the interpolation may be settable by user operation. Setting of input and output frame rates may be appropriately associated with a reference frame rate or the like of an upload condition.

2-4-4. Highlighted Moving Image

The present system 10 may request the image processing server 200 to perform image processing of creating a highlighted moving image indicating a highlight with respect to a moving image (or a plurality of still images) shot with the digital camera 100.

The digital camera 100 of the present embodiment may receive user operation of selecting a subject to be a subject matter of a highlighted moving image as pre-setting (upload condition) related to creation processing of the highlighted moving image. For example, a subject of a type such as a person, an animal, or a vehicle may be selected as a subject matter of a highlighted moving image.

A "person" as a subject set as a subject matter of a highlighted moving image as described above may be accompanied by individual identification. A subject "animal" may be a dog, a cat, a bird, an insect, or another animal. A subject "vehicle" may be an airplane, a railway (train), a car, a motorcycle, or another vehicle. As a subject matter of such a highlighted moving image, a plurality of subjects may be selected from the above options such as "person" and "motorcycle", for example. For example, the digital camera 100 can reduce communication load or the like with the image processing server 200 by excluding image data in which a subject of a pre-set subject matter is not shown from a request object to the image processing server 200.

In the request object selection processing based on an upload condition as described above, the controller 135 of the digital camera 100 may extract a still image or a moving image including an image of a subject matter set as described above by image recognition on shot image data and determine the image as a request object, for example.

3. Summary

As described above, the digital camera 100 according to the present embodiment includes the communication module 155 as an example of a communication interface, the image sensor 115 as an example of an image sensor, the controller 135, and the user interface 150 as an example of a setting interface. The communication module 155 performs data communication with the image processing server 200 connected via the communication network 15. The image sensor 115 captures a subject image and generates image data. The controller 135 transmits image data to the image processing server 200 via the communication module 155, and requests the image processing server 200 to perform image processing on the image data. Setting information related to a request for image processing is acquired according to user operation (S1). The controller 135 limits image data to specific image data among pieces of image data generated by the image sensor 115 on the basis of setting information acquired according to user operation, and requests the image processing server 200 to perform specific image processing (S3 to S5).

According to the digital camera 100 described above, in the imaging system 10, it is possible to reduce system load of requesting image processing from the digital camera 100 according to an intention of the user.

In the digital camera 100 according to the present embodiment, the setting information in FIG. 8 and the like includes an upload condition as an example of a request condition for requesting specific image processing. The controller 135 selects image data satisfying a request condition in setting information acquired according to user operation from pieces of image data generated by the image sensor 115 on the basis of the setting information (S24), and requests the image processing server 200 to perform specific image processing on the selected image data (S4, S5). According to the digital camera 100 described above, image data requested to the image processing server 200 is selected on the basis of an upload condition set according to an intention of the user, and system load can be easily reduced according to an intention of the user.

In the digital camera 100 of the present embodiment, the controller 135 does not transmit, to the image processing server 200, image data that is not selected from pieces of image data generated by the image sensor 115 on the basis of an upload condition in setting information, and transmits selected image data to the image processing server 200 (S3 to S5). In this way, communication load and processing load of the present system 10 can be easily reduced.

In the digital camera 100 of the present embodiment, before specific image data is generated by the image sensor 115, the user interface 150 acquires setting information of an upload condition according to user operation (S1, S2). After specific image data is generated by the image sensor 115, the controller 135 requests the image processing server 200 to perform specific image processing on the specific image data on the basis of setting information (S2 to S5). In this way, a request to the image processing server 200 can be appropriately restricted on the basis of an upload condition set in advance for shooting, and load of the present system 10 can be easily reduced.

The digital camera 100 of the present embodiment further includes the image processing engine 120 as an example of an image processor having image processing performance lower than image processing performance at which the image processing server 200 executes image processing. According to the present system 10, image processing performance of the digital camera 100 can be relatively low, and a configuration of the digital camera 100 can be simplified.

The imaging system 10 according to the present embodiment includes the digital camera 100 and the image processing server 200. The image processing server 200 is connected to the digital camera 100 via the communication network 15, and the imaging system 10 including the image processing server 200 that performs image processing requested by the digital camera 100 on image data received from the digital camera 100 is provided. According to the present system 10, it is possible to reduce load of the system that is requested to perform image processing by an imaging apparatus according to an intention of the user.

Second Embodiment

Hereinafter, a second embodiment of the present disclosure will be described with reference to FIGS. 15 to 19. In the first embodiment, the example in which the digital camera 100 restricts a request object of image processing for each file of a shooting result is explained. In the second embodiment, an example in which the digital camera 100 dynamically identifies a request object in a file will be described.

Hereinafter, description of a configuration and operation similar to those of the imaging system 10 and the digital camera 100 according to the first embodiment will be omitted as appropriate, and the imaging system 10 and the digital camera 100 according to the present embodiment will be described.

Figure 15:
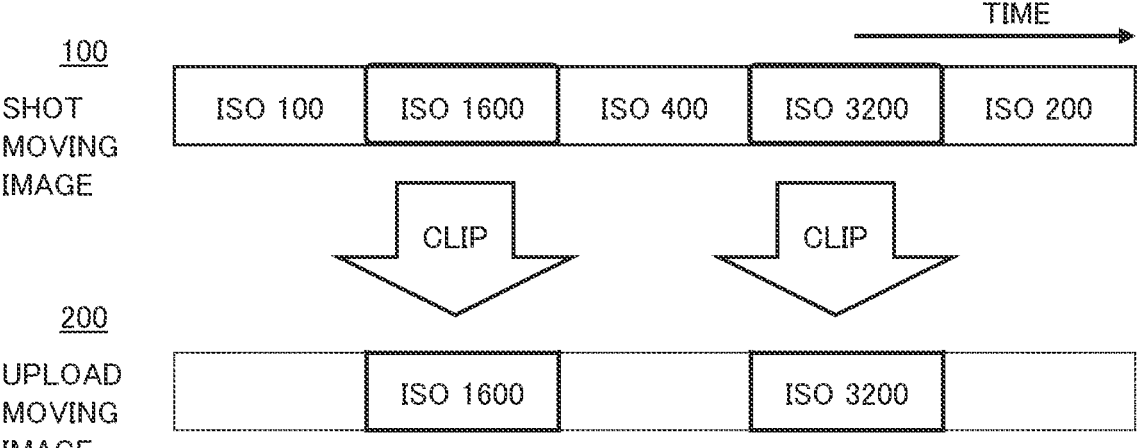
FIG. 15 is a timing chart for explaining operation of the digital camera in a second embodiment.
Figure 16:
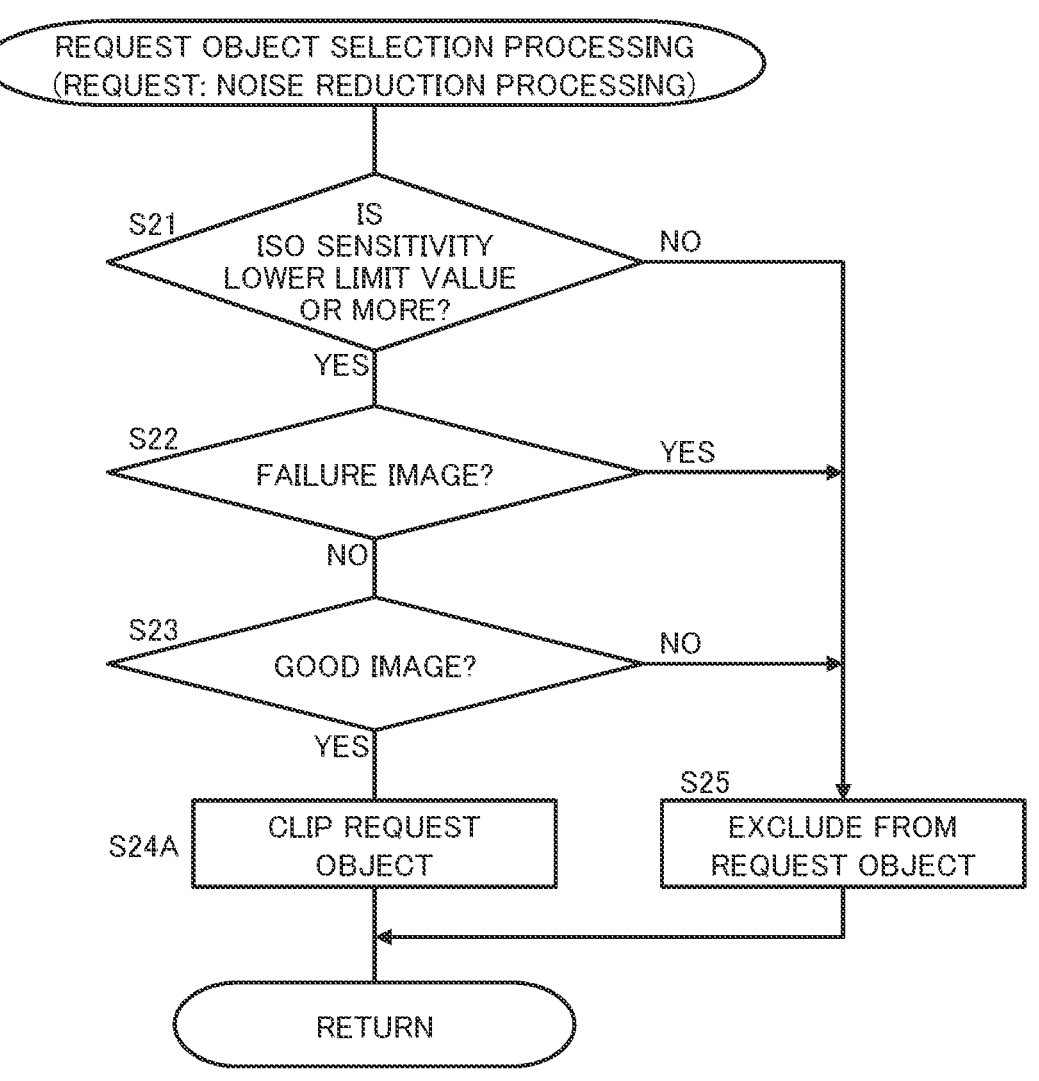
FIG. 16 is a flowchart illustrating an example of the request object selection processing in the digital camera according to the second embodiment.

FIG. 15 illustrates a timing chart for explaining operation of the digital camera 100 in the present embodiment. FIGS. 16 and 17 illustrate an example of request object selection processing for the noise reduction processing according to the present embodiment.

The digital camera 100 of the present embodiment clips a portion of a range to be a request object in one file without limitation to the entire one file of moving image data, and transmits the clipped portion to the image processing server 200. For example, in addition to performing Steps S21 to S23 and S25 as in the first embodiment, the controller 135 of the present embodiment clips a moving image with reference to an upload condition (FIG. 17) as exemplified in FIG. 16 instead of Step S21 of FIG. 11 (S24A).

FIG. 15 exemplifies a timing of change in ISO sensitivity in a moving image shot with the digital camera 100, and a timing of a moving image uploaded to the image processing server 200 corresponding to the shot moving image. For example, in the example of FIG. 15, ISO sensitivity changes from moment to moment during shooting of one moving image. For example, a case where moving image shooting is performed in an operation mode in which the digital camera 100 automatically adjusts ISO sensitivity of imaging operation of the image sensor 115, a case where the user changes ISO sensitivity during shooting, or the like is assumed.

In view of the above, in the digital camera 100 of the present embodiment for example, on the basis of the upload condition set as illustrated in FIG. 17 in the above case, the controller 135 clips a portion corresponding to the above condition in a corresponding shot moving image as exemplified in the upload moving image of FIG. 15 (S24A). In this way, in various scenes in a moving image shot with the digital camera 100, it is possible to further reduce an amount of data uploaded to the image processing server 200 while including, in a request object, a scene in which noise may be regarded as a problem because ISO is relatively large for the user. For example, clipping of a moving image can be performed in units of group of pictures (GOP).

The present system 10 can perform connecting processing of connecting moving image data of a portion to which the noise reduction processing is applied as described above and moving image data of another portion in a moving image shot with the digital camera 100, and generate a moving image file corresponding to an entire shooting result. For example, the image editing PC 300 downloads moving image data of a noise reduced portion from the image processing server 200 and integrally connects the portion with an entire shot moving image using moving image editing software.

In the present embodiment, an upload condition for dynamically clipping a request object from a moving image is not particularly limited to ISO sensitivity, and for example, a detection result of a specific subject may be used. Setting as to whether or not to perform partial clipping of a moving image from such various viewpoints may be managed in setting information of an upload condition as exemplified in FIG. 17. For example, in the example of FIG. 17, the controller 135 may detect a frame image in which a specific subject such as a face or a pupil is detected in a moving image on the basis of a result of various image recognition during shooting of the moving image, and clip image data of only the detected frame image or a predetermined period including before and after the detected frame image as a request object (S24A).

For example, the user's desire that noise should be removed from an image (frame) in which a face appears in a moving image, but noise should not necessarily be removed from an image of only a landscape is assumed. In order to meet such a desire, the digital camera 100 according to the present embodiment clips a time section for one scene including a frame in which a face, a pupil, or the like is detected from an entire moving image, and sets the time section as an upload object to the image processing server 200. By the above, an amount of data considered to be unnecessary processing load in the present system 10 can be further reduced.

The imaging system 10 of the present embodiment may dynamically clip a moving image not only at the time of the noise reduction processing but also at the time of requesting another type of image processing. For example, at the time of processing similar to that of the first embodiment (FIG. 12), if face exclusion is ON in an upload condition of the noise addition processing (see FIG. 13), the digital camera 100 of the present system 10 may perform clipping according to a result of face detection in a moving image instead of Steps S24 and S27. For example, the controller 135 of the present embodiment may identify a scene in which no face is detected in an entire moving image file and clip a time section corresponding to the identified scene. This is useful in a case where the user does not want to add granular noise or the like to the face in the moving image, for example.

In a request for image processing of various moving images, the present system 10 may set detection of a motion of a subject as an upload condition for clipping as illustrated in FIGS. 18 and 19, for example. For example, in a slow-motion moving image, a case where a scene in which a subject has motion in a moving image is to be reproduced in slow motion is assumed. In view of the above, in the digital camera 100 of the present embodiment, the controller 135 may identify a scene in which a motion of a subject is detected in an entire moving image file and clip a request object to the image processing server 200.

For example, the present system 10 may set recognition of a specific subject such as a person or an animal as an upload condition for clipping, as illustrated in FIGS. 18 and 19, in a request for image processing of a slow-motion moving image or a highlighted moving image. For example, in a slow-motion moving image, a case where there is no need to perform slow reproduction for a scene in which a subject as a subject matter is not shown and a landscape is shown. Therefore, the controller 135 of the present embodiment may identify a scene in which a subject of a subject matter is detected in an entire moving image file and clip a request object of the image processing server 200.

For example, in the present system 10, in a case where a length of a highlighted moving image is set to a predetermined period (e.g., ten minutes) or the like in advance, when a period of a moving image uploaded to the image processing server 200 is shorter than the predetermined period (e.g., five minutes), additional upload may be performed. For example, the image processing server 200 may request the digital camera 100 to additionally upload a scene close to a best scene corresponding to an original upload condition.

As described above, in the digital camera 100 according to the present embodiment, the controller 135 clips a portion satisfying an upload condition in setting information in a moving image captured by the image sensor 115 (S24A), and requests the image processing server 200 to perform specific image processing on image data indicating a moving image of the clipped portion. By the above, the present system 10 can select a request object in one moving image and reduce a data amount of the request object.

Third Embodiment

Hereinafter, a third embodiment of the present disclosure will be described with reference to FIG. 20. In the second embodiment, the example in which the digital camera 100 identifies a range for which a moving image is clipped. In the third embodiment, an example in which the image processing server 200 identifies a range for which a moving image is clipped.

Hereinafter, description of a configuration and operation similar to those of the imaging system 10 and the digital camera 100 according to the first and second embodiments will be omitted as appropriate, and the imaging system 10 and the digital camera 100 according to the present embodiment will be described.

Figure 20:
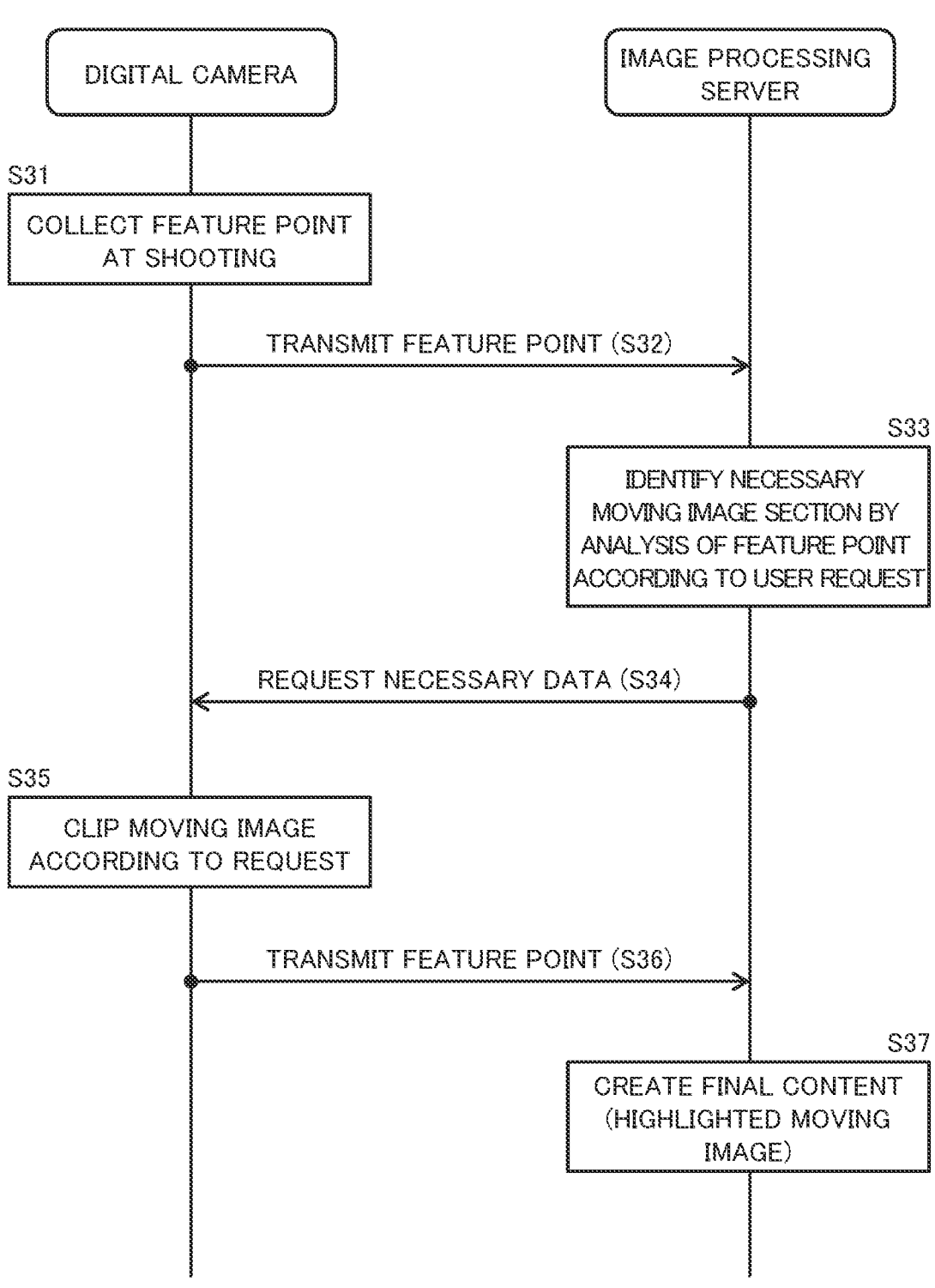
FIG. 20 is a sequence diagram for explaining operation of the imaging system of a third embodiment.

FIG. 20 is a sequence diagram for explaining operation of the imaging system 10 in the third embodiment. Processing illustrated in FIG. 20 starts in a state in which request content of image processing is registered in the image processing server 200 in advance from the digital camera 100 in creation of a highlighted moving image, for example.

First, at the time of shooting by the digital camera 100, the controller 135 sequentially collects various feature points in a moving image or the like being shot, for example (S31). For example, feature point extraction of image recognition is performed for features such as frame-in of an object, a significant motion of an object, a significant motion on the camera side, and face recognition. The feature point for a scene such as calling a name may be collected in voice recognition, or position information such as GPS information during shooting may be collected. Not only a moving image but also a plurality of still images may be a processing object. For example, the digital camera 100 may include a microphone that acquires voice during shooting, or may include an interface circuit connected to an external microphone.

For example, under control of the controller 135, the digital camera 100 transmits feature information indicating a collected feature point from the communication module 155 to the image processing server 200 via the communication network 15 (S32). The feature information includes identification information of a moving image in which a feature point is collected, a timing at which each feature point is collected in a moving image, and a collected feature point, for example. The digital camera 100 may transmit request content of image processing to the image processing server 200 simultaneously with transmission of the feature information.

The image processing server 200 receives the feature information from the digital camera 100 via the communication interface 250. Then, the controller 210 of the image processing server 200 analyzes a feature point included in the received feature information on the basis of e.g. content of image processing registered in advance according to a user request, and identifies a time section in which image data is to be acquired from an entire moving image (S33).

For example, the processing in Step S33 is performed such that a feature point corresponding to a request registered in advance by the user is analyzed by an artificial intelligence (AI) model or the like, so that a moving image section including a portion necessary in content that is to be finally created as a highlighted moving image or the like is determined. For example, such an AI model can be constructed by machine learning using a highlighted moving image created in accordance with a user's request in the past, moving image data as a source of the highlighted moving image, a feature point of original moving image data, and the like as training data.

Based on the analysis result, the image processing server 200 requests the digital camera 100 for image data necessary for creating final content (S33). The request includes a type of requested moving image content, a time section required in a moving image, and the like.

In response to a request from the image processing server 200, the controller of the digital camera 100 clips image data of a time section requested in the moving image (S34), and transmits the clipped image data from communication module 155 to image processing server 200 (S35). At this time point, image data transmitted from the digital camera 100 to the image processing server 200 can be limited to only image data necessary in consideration of a final work, and a data transmission amount can be accurately reduced.

After the above, the image processing server 200 receives image data from the digital camera 100, performs image processing of giving various effects and the like to the received image data, and creates final content (e.g., a highlighted moving image) (S36).

According to the above operation of the present system 100, before transmission of image data for which image processing is requested, the digital camera 100 performs various feature point detection and transmits the detected feature point to the image processing server 200 as appropriate (S31, S32). For example, in a case where a highlighted moving image of a scene where a railroad train passes is requested, the digital camera 100 sends, to the image processing server 200, information on a feature point such as time of each of frame-in and frame-out of an object such as a railroad train and time during which sound has a predetermined value or more. Alternatively, in a case where a highlighted moving image of a scene in which a person is shown is requested, the digital camera 100 sends, to the image processing server 200, a feature point such as a time at which face recognition, head recognition, or human body recognition is performed.

The image processing server 200 analyzes how much time section in which moving image content is finally required on the basis of various feature point information and request content received from the digital camera 100, and requests the digital camera 100 to transmit data (S33, S34). Even in a case where processing of the analysis (S33) for clipping is difficult with processing capability of the digital camera 100, processing capability of the image processing server 200 can be utilized to accurately clip a moving image, and communication load of the present system 10 can be reduced. The feature point detection in Step S31 can be appropriately set to executable processing within a range of processing capability of the digital camera 100.

In the present system 10, the image processing server 200 is in charge of the analysis (S33) of a clipping range, so that the digital camera 100 can freely execute image shooting during the analysis in Step S33. In this way, it is possible to prevent a situation in which the user misses a shutter opportunity in the present system 10.

The present system 10 may cause the image processing server 200 to perform image processing of creating a moving image or the like by combining shooting results of a plurality of the digital cameras 100. In this case, when receiving image data from a plurality of the digital cameras 100, the image processing server 200 can request necessary image data from each of the digital cameras 100 by analysis from the viewpoint of final content obtained by combining the image data (S33, S34). For example, final content in which a moving image from each of the digital cameras 100 is switched can also be created, and communication load in the present system 10 at this time can be reduced.

As described above, in the digital camera 100 of the present embodiment, the controller 135 extracts a feature point in image data generated by the image sensor 115 (S31), transmits the extracted feature point to the image processing server 200 (S32), and transmits image data for which specific image processing is to be performed to the image processing server 200 in response to a request from the image processing server 200 (S35). By the above, the present system 10 can cause the image processing server 200 to perform processing of identifying image data as a request object, and can accurately perform clipping of the request object.

Other Embodiments

As described above, the first to third embodiments are described as an example of the technique disclosed in the present application. However, the technique in the present disclosure is not limited to this, and is applicable to embodiments in which changes, replacements, additions, omissions, and the like are appropriately made. Further, each constituent described in the first to third embodiments can be combined to make a new embodiment.

In the first to third embodiments described above, the imaging system 10 that requests the image processing server 200 to perform image processing on a shooting result in the digital camera 100 is described. The imaging system 100 according to the present embodiment may be configured such that the user can apply for a service for receiving a shooting instruction at the time of requesting image processing to the image processing server 200. Such a variation will be described with reference to FIG. 21.

FIG. 21 illustrates request data by the digital camera 100 in the imaging system 10 of the present variation. For example, when the user makes setting to receive application for a service at the time of pre-setting such as Step S1 in FIG. 4, the present system 10 is configured such that the setting can be reflected at the time of image processing request. For example, in Step S5 of FIG. 4, as exemplified in FIG. 21, the controller 135 of the digital camera 100 includes, in request information to be transmitted to the image processing server 200, application for the service, various shooting conditions at the time of image shooting (S2), and the like.

For example, in the image processing server 200, an AI and a database in which a subject matter, composition, and technique of a style of an example that has won a prize in various contests are learned are prepared. The controller 210 of the image processing server 200 finds an example similar to each item in the database on the basis of image data for which image processing is requested, and feeds back instruction information including an explanation sentence of a difference between the example and a requested image and a point to be improved to the image editing PC 300 or the like together with image data for which image processing has been performed. In a case where the user wants to know the shooting condition by looking at the transmitted example, the present system 10 can also make a request for acquiring the shooting condition from the image editing PC 300, for example.

According to the imaging system 10 of the present embodiment as described above, the user can receive an instruction service for a shot image at the same time when making an image processing request. For this reason, the user receives an image processing service and an image shooting instruction at the same time, the convenience is high, and a shooting technique of the user can be expected to be improved. Note that, in the present system 10, the user may transmit image data for which image processing has been completed to the image processing server 200 to receive a shooting instruction service.

As described above, in the digital camera 100 of the present embodiment, the controller 135 notifies the image processing server 200 of a shooting condition of image data via the communication module 155, and requests information regarding a shooting instruction for the image data (see FIG. 21). By the above, the user can receive instruction in shooting in the present system 10, and convenience of the present system 10 can be improved.

In the above embodiments, the digital camera 100 including the card slot 140 is described. In the present embodiment, the digital camera 100 does not need to particularly include the card slot 140. For example, in the present system 10, the digital camera 100 in particular may be configured not to use a recording medium such as the memory card 142 in a case where a failure image shot with the digital camera 100 is erased and a successful image other than a failure image is uploaded. The digital camera 100 of the present embodiment may include a slot or the like for recording image data in various recording media such as an SSD without limitation to recording in the memory card 142 in particular, and, or may distribute data to the communication network 15 via the communication module 155.

In the above embodiments, the digital camera 100 including the optical system 110 and the lens driver 112 is exemplified. The imaging apparatus of the present embodiment may not include the optical system 110 and the lens driver 12, and may be an interchangeable lens type camera, for example.

In the above embodiments, the digital camera is described as an example of the imaging apparatus, but the present invention is not limited to this. The imaging apparatus of the present disclosure may be an electronic device (e.g., a video camera, a smartphone, a tablet terminal, or the like) having an image shooting function.

Summary of Aspects

Hereinafter, various aspects according to the present disclosure will be listed.

A first aspect according to the present disclosure provides an imaging apparatus including a communication interface that communicates data with an image processing apparatus connected via a communication network, an image sensor that captures a subject image to generate image data, a controller that transmits the image data to the image processing apparatus via the communication interface to request image processing for the image processing apparatus on the image data, and a setting interface that acquires setting information on a request for image processing, according to user operation. Based on the setting information acquired with the user operation, the controller limits specific image data from the image data generated by the image sensor, and requests, for the image processing apparatus, specific image processing thereon.

According to a second aspect, in the imaging apparatus according to the first aspect, the setting information includes a request condition for requesting the specific image processing. The controller selects, based on the setting information acquired with the user operation, image data satisfying the request condition in the setting information from pieces of image data generated by the image sensor, and requests the image processing apparatus to perform the specific image processing on the selected image data.

According to a third aspect, in the imaging apparatus according to the second aspect, based on the request condition in the setting information, the controller does not transmit unselected image data to the image processing apparatus, and transmits the selected image data to the image processing apparatus, the unselected image data being image data that is not selected from the image data generated by the image sensor.

According to a fourth aspect, in the imaging apparatus according to the second or third aspect, the controller clips a portion in a moving image captured by the image sensor, the clipped portion satisfying the request condition included in the setting information, and requests, for the image processing apparatus, the specific image processing on image data indicating the clipped portion of the moving image.

According to a fifth aspect, in the imaging apparatus according to any one of the second to fourth aspects, the setting interface acquires the setting information, according to the user operation before the specific image data is generated by the image sensor. After the specific image data is generated by the image sensor, the controller requests, for the image processing apparatus, the specific image processing on the specific image data, based on the setting information.

According to a sixth aspect, in the imaging apparatus according to anyone of the first to fifth aspects, the controller extracts a feature point in the image data generated by the image sensor, transmits the extracted feature point to the image processing apparatus, and transmits object image data to the image processing apparatus, according to a request from the image processing apparatus, the object image data being an object which the specific image processing is to be processed.

According to a seventh aspect, the imaging apparatus according to anyone of the first to sixth aspects further includes an image processor having image processing performance lower than image processing performance with which the image processing apparatus executes the image processing.

According to an eighth aspect, in the imaging apparatus according to any one of the first to seventh aspects, the controller notifies the image processing apparatus of a shooting condition of image data via the communication interface, and requests information on a shooting instruction for the image data.

A ninth aspect provides an imaging system including the imaging apparatus according to any one of the first to eighth aspects, and an image processing apparatus that is connected to the imaging apparatus via a communication network and performs image processing requested by the imaging apparatus on image data received from the imaging apparatus.

As described above, the embodiments are described as an example of the technique in the present disclosure. For this purpose, the accompanying drawings and the detailed description are provided.

Accordingly, constituents described in the accompanying drawings and the detailed description may include not only a constituent essential for solving the problem but also a constituent which is not essential for solving the problem in order to exemplify the above technique. Therefore, it should not be immediately recognized that these non-essential constituents are essential based on the fact that these non-essential constituents are described in the accompanying drawings and the detailed description.

Further, the above-described embodiments are provided to exemplify the technique in the present disclosure, and hence it is possible to make various changes, replacements, additions, omissions, and the like within the scope of claims or the scope equivalent to claims.

An idea of the present disclosure can be applied to an electronic device (an imaging apparatus such as a digital camera, a camcorder, or a box camera, a mobile phone, a smartphone, or the like) having an imaging function.

The invention claimed is:

1. An imaging apparatus comprising:
a communication interface that communicates data with an image processing apparatus connected via a communication network,
an image sensor that captures a subject image to generate image data,
a controller that transmits the image data to the image processing apparatus via the communication interface, to request image processing to the image processing apparatus on the image data, and
a setting interface that acquires setting information in response to user operation input on the setting interface, the setting information defining whether or not to request image processing to the image processing apparatus, wherein based on the setting information acquired by the setting interface with the user operation, the controller limits specific image data from the image data generated by the image sensor, to request specific image processing thereon to the image processing apparatus.

2. The imaging apparatus according to claim 1, wherein the setting information includes a request condition for requesting the specific image processing, wherein the controller selects, based on the setting information acquired with the user operation, image data satisfying the request condition in the setting information from the image data generated by the image sensor, and requests the image processing apparatus to perform the specific image processing on the selected image data.

3. The imaging apparatus according to claim 2, wherein based on the request condition in the setting information, the controller does not transmit unselected image data to the image processing apparatus, and transmits the selected image data to the image processing apparatus, the unselected image data being image data that is not selected from the image data generated by the image sensor.

4. The imaging apparatus according to claim 2, wherein the controller clips a portion in a moving image captured by the image sensor, the clipped portion satisfying the request condition included in the setting information, and requests, for the image processing apparatus, the specific image processing on image data indicating the clipped portion of the moving image.

5. The imaging apparatus according to claim 1, wherein the setting interface acquires the setting information, according to the user operation before the specific image data is generated by the image sensor, and after the specific image data is generated by the image sensor, the controller requests, for the image processing apparatus, the specific image processing on the specific image data, based on the setting information.

6. The imaging apparatus according to claim 1, wherein the controller extracts a feature point in the image data generated by the image sensor, transmits the extracted feature point to the image processing apparatus, and transmits object image data to the image processing apparatus, according to a request from the image processing apparatus, the object image data being an object which the specific image processing is to be processed.

7. The imaging apparatus according to claim 1, further comprising an image processor having image processing performance lower than image processing performance with which the image processing apparatus executes the image processing.

8. The imaging apparatus according to claim 1, wherein the controller notifies the image processing apparatus of a shooting condition of the image data via the communication interface, and requests information on a shooting instruction for the image data.

9. An imaging system comprising:

the imaging apparatus according to claim 1, and an image processing apparatus that is connected to the imaging apparatus via the communication network, to perform the image processing requested by the imaging apparatus on image data received from the imaging apparatus.

* * * * *